(12) United States Patent
Sakikawa

(10) Patent No.: US 8,151,927 B2
(45) Date of Patent: Apr. 10, 2012

(54) WHEEL MOTOR DEVICE

(75) Inventor: Shigenori Sakikawa, Hyogo (JP)

(73) Assignee: Kanzaki Kokyukoki Mfg. Co., Ltd., Hyogo (JP)

(\*) Notice: Subject to any disclaimer, the term of this patent is extended or adjusted under 35 U.S.C. 154(b) by 1146 days.

(21) Appl. No.: 11/923,928

(22) Filed: Oct. 25, 2007

(65) Prior Publication Data

US 2008/0099269 A1 May 1, 2008

(30) Foreign Application Priority Data

Oct. 26, 2006 (JP) ................................. 2006-290731

(51) Int. Cl.
*B60K 17/356* (2006.01)

(52) U.S. Cl. .................... 180/308; 180/305; 180/307

(58) Field of Classification Search .................. 180/305, 180/307, 308, 53.4, 242, 367
See application file for complete search history.

(56) References Cited

U.S. PATENT DOCUMENTS

| 3,008,424 | A | * | 11/1961 | Roth ............................. 418/177 |
| 5,957,229 | A | | 9/1999 | Ishii |
| 6,125,630 | A | * | 10/2000 | Abend et al. .................... 60/487 |
| 6,151,895 | A | * | 11/2000 | Matsura .......................... 60/490 |
| 6,564,550 | B2 | * | 5/2003 | Thoma et al. ................... 60/487 |
| 6,849,028 | B2 | * | 2/2005 | Nakatani et al. ................ 477/52 |
| 7,377,106 | B2 | * | 5/2008 | Sakikawa et al. ............... 60/486 |
| 7,407,030 | B2 | * | 8/2008 | Yasuda et al. .................. 180/305 |
| 7,431,124 | B2 | * | 10/2008 | White, Jr. ....................... 180/307 |
| 7,523,611 | B2 | * | 4/2009 | Dong et al. ..................... 60/487 |
| 7,658,257 | B2 | * | 2/2010 | Sakikawa et al. ............. 180/308 |
| 7,806,667 | B1 | * | 10/2010 | Hauser et al. .................. 417/269 |
| 2003/0019680 | A1 | | 1/2003 | Johnson |
| 2004/0154278 | A1 | * | 8/2004 | Samejima et al. ............. 56/14.7 |
| 2006/0016186 | A1 | * | 1/2006 | Dong et al. ..................... 60/494 |
| 2006/0039801 | A1 | | 2/2006 | Dong et al. |
| 2007/0137918 | A1 | | 6/2007 | Dong et al. |
| 2007/0193264 | A1 | * | 8/2007 | Dong et al. ..................... 60/487 |
| 2007/0219047 | A1 | * | 9/2007 | Nakatani et al. ................ 477/95 |
| 2008/0072587 | A1 | * | 3/2008 | Sakikawa et al. ............... 60/435 |
| 2008/0083580 | A1 | * | 4/2008 | White ............................ 180/308 |

FOREIGN PATENT DOCUMENTS

JP 2006-096112 4/2006

OTHER PUBLICATIONS

International Search Report for European Application No. EP 07 11 9189, European Patent Office, mailed Feb. 21, 2008, 7 pgs.

\* cited by examiner

*Primary Examiner* — J. Allen Shriver, II
*Assistant Examiner* — Travis Coolman
(74) *Attorney, Agent, or Firm* — Sterne, Kessler, Goldstein & Fox, P.L.L.C.

(57) ABSTRACT

There is provided a wheel motor device including a hydraulic motor unit. The hydraulic motor unit includes a hydraulic motor main body, a motor shaft, a motor case and a port block. The port block includes a motor surface to which the motor case is connected, a pump surface to which a pump case surrounding a hydraulic pump main body is detachably connected so as to form a pump space for accommodating the hydraulic pump main body, and a pair of operational fluid passages fluidly connecting between the hydraulic motor main body accommodated in the motor space in a state of being contacted with the motor surface in a sliding manner around its axis line and the hydraulic pump main body accommodated in the pump space in a state of being contacted with the pump surface in a sliding manner around its axis line.

2 Claims, 23 Drawing Sheets

WHEEL MOTOR DEVICE

BACKGROUND OF THE INVENTION

1. Field of the Invention

The present invention relates to a wheel motor device including a hydraulic motor unit for operatively driving a corresponding driving wheel.

2. Related Art

A wheel motor device provided in a vehicle so as to independently drive a corresponding driving wheel has been conventionally known (for example, see Japanese unexamined patent publication No. 2006-96112).

Since the wheel motor device can be arranged close to the corresponding driving wheel, a free space could be secured between a pair of driving wheels and a degree of design freedom of the vehicle could be enhanced compared to a transaxle-driving device including a differential gear device for differentially connecting the pair of driving axle.

However, with the conventional configuration, it is needed to independently attach the wheel motor device and a hydraulic pump main body, which cooperates with a hydraulic motor main body in the wheel motor device, to a vehicle main body, and then fluidly connect the hydraulic motor main body and the hydraulic pump main body by an external conduit, in the assembly work to the vehicle main body, resulting in worse assembly workability and worse piping workability.

Furthermore, it is desirable to perform adjustment work of a traveling hydrostatic transmission (HST) configured by the hydraulic motor main body and the hydraulic pump main body in a state where the hydraulic motor main body and the hydraulic pump main body are fluidly connected to each other with a condition corresponding to a vehicle-mounted condition where they are mounted to the vehicle main body. However, with the conventional configuration, such adjustment work could not be performed unless the wheel motor device and the hydraulic pump main body are actually attached to the vehicle main body.

SUMMARY OF THE INVENTION

The present invention is made in consideration of the above prior art, and it is an object to provide a wheel motor device including a hydraulic motor unit that has a hydraulic motor main body forming a traveling HST in cooperation with a hydraulic pump main body, the wheel motor device capable of improving workability of mounting the hydraulic motor main body and the hydraulic pump main body to a vehicle main body while ensuring a free space between a pair of driving wheels, and also capable of improving efficiency of a work of fluidly connecting between the hydraulic pump main body and the hydraulic motor main body, and a work of adjusting the HST.

The present invention provides, in order to achieve the object, a wheel motor device having a hydraulic motor unit that includes a hydraulic motor main body forming an HST in cooperation with a hydraulic pump main body operatively driven by a driving power source and a motor shaft supporting the hydraulic motor main body in a relatively non-rotatable manner and operatively driving a corresponding driving wheel, the wheel motor device directly or indirectly supporting the corresponding driving wheel, wherein the hydraulic motor unit includes the hydraulic motor main body, the motor shaft, a motor case surrounding the hydraulic motor main body and a port block detachably connected to the motor case so as to form a motor space for accommodating the hydraulic motor main body, and the port block includes a motor surface to which the motor case is connected, a pump surface to which a pump case surrounding the hydraulic pump main body is detachably connected so as to form a pump space for accommodating the hydraulic pump main body and a pair of operational fluid passages fluidly connecting between the hydraulic motor main body accommodated in the motor space in a state of being contacted with the motor surface in a sliding manner around its axis line and the hydraulic pump main body accommodated in the pump space in a state of being contacted with the pump surface in a sliding manner around its axis line.

According to the present invention, since the port block, which supports the hydraulic motor main body and the motor case such that the hydraulic motor main body could be positioned close to the corresponding driving wheel, is configured so as to also support the hydraulic pump main body and the pump case, it is not necessary to individually mount the wheel motor device and the hydraulic pump main body to the vehicle main body in contrast with the conventional wheel motor device. Therefore, it is possible to mount the hydraulic motor main body and the hydraulic pump main that forms a traveling system hydrostatic transmission to the vehicle main body with improved efficiency while ensuring a free space between the pair of driving wheels.

Further, according to the present invention, since the port block is formed with the pair of operational fluid passages for fluidly connecting the hydraulic motor main body and the hydraulic pump main body, it is not necessary to fluidly connect between them using an external conduit in contrast with the conventional wheel motor device. Therefore, it is possible to achieve an improved workability in assembling and a reduced cost thanks to the omission of the external conduit.

Furthermore, according to the present invention, it is possible to perform an adjusting work of the HST formed by the hydraulic motor main body and the hydraulic pump main body without actually attaching these bodies to the vehicle main body and with a usage condition corresponding to a vehicle-mounted condition where these bodies are mounted on the vehicle main body, thereby improving efficiency of the adjustment work of the HST.

In particular, in a case where the hydraulic equipment manufacturing company manufactures the hydraulic pump main body and the hydraulic motor main body that forms the HST, and the vehicle manufacturing company attaches these main bodies to the vehicle main body to complete the working vehicle, the wheel motor device according to the present invention allows the hydraulic equipment manufacturing company to carry out the adjustment work of the hydraulic pump main body and the hydraulic motor main body with a condition corresponding to the vehicle-mounted condition before shipment of the hydraulic pump main body and the hydraulic motor main body. Therefore, the vehicle manufacturing company could assemble the traveling hydrostatic transmission to the vehicle main body, only with an extremely simple work of attaching the wheel motor device according to the present invention to the vehicle main body.

In one aspect of the present invention, the port block includes a vertical portion extending substantially vertically so as to be orthogonal to a rotational axis line of the corresponding driving wheel and a horizontal portion extending substantially horizontally from the vertical portion. In the configuration, an outer surface of the vertical portion facing outward in the width direction of the vehicle forms the motor surface, and an upper surface of the horizontal portion facing upward forms the pump surface.

In one embodiment, the horizontal portion extends inward in the width direction of the vehicle from an upper end of the vertical portion.

In another embodiment, the horizontal portion extends toward one side in a longitudinal direction of the vehicle from a lower end of the vertical portion.

Preferably, the motor shaft extends in the width direction of the vehicle while passing through the vertical portion. The hydraulic motor main body is supported in a relatively non-rotatable manner at a portion of the motor shaft positioned on an outer side in the width direction of the vehicle than the vertical portion. The wheel motor device is further provided with a second hydraulic motor unit that includes a second hydraulic motor main body supported in a relatively non-rotatable manner at a portion of the motor shaft positioned on an inner side in the width direction of the vehicle than the vertical portion and a second motor case detachably connected to an inner surface of the vertical portion facing inward in the width direction of the vehicle so as to surround the second hydraulic motor main body. The pair of operational fluid passages fluidly connect the hydraulic motor main body and the second hydraulic motor main body to the hydraulic pump main body in parallel.

According to the preferable configuration, it is possible to increase the volume of the motor side of the HST while preventing the enlargement of the wheel motor device as much as possible.

More preferably, the hydraulic pump unit includes a pump-side output adjusting member for changing the volume of the hydraulic pump main body, the hydraulic motor unit includes a fixed swash plate for keeping the volume of the hydraulic motor main body constant, and the second hydraulic motor unit includes a motor-side output adjusting member for changing the volume of the second hydraulic motor main body. The motor-side adjusting member is capable of adjusting the volume of the second hydraulic motor main body between a neutral state at which the volume of the second hydraulic motor main body is set substantially at zero and a maximum volume state at which the volume of the second hydraulic motor main body is changed to a maximum level in such a direction that the total volume of the hydraulic motor main body and the second hydraulic motor main body increases.

According to the configuration, it is possible to easily adjust the volume of the motor side of the HST in accordance with a traveling condition of the working vehicle.

In each of the above various configurations, the wheel motor device may further include an auxiliary pump main body operatively driven by a pump shaft that drives the hydraulic pump main body, the auxiliary pump main body being supported at a lower surface of the horizontal portion.

In another aspect of the present invention, the port block includes a motor-side port block extending substantially vertically so as to be orthogonal to the rotational axis of the corresponding driving wheel and having a vertical surface facing outward in the width direction of the vehicle, and a pump-side port block having a horizontal surface facing upward and detachably connected to the motor-side port block so as to be positioned above the motor shaft. The vertical surface forms the motor surface, and the horizontal surface forms the pump surface.

Preferably, the motor-side port block integrally includes a vertical portion having the vertical surface and a horizontal portion extending inward and outward in the width direction of the vehicle from the upper end of the vertical portion. The pump-side port block is detachably connected to an upper surface of the horizontal portion such that the horizontal surface faces upward.

More preferably, the wheel motor device may further include an auxiliary pump main body operatively driven by a pump shaft that drives the hydraulic pump main body, the auxiliary pump main body being accommodated between the horizontal portion and the pump-side port block.

The motor-side port block preferably includes a second vertical surface facing inward in the width direction of the vehicle. The motor shaft extends in the width direction of the vehicle while passing through the vertical surface and the second vertical surface. The hydraulic motor main body is supported in a relatively non-rotatable manner at a portion of the motor shaft positioned on an outer side in the width direction of the vehicle than the vertical surface. The wheel motor device further includes a second hydraulic motor unit that has a second hydraulic motor main body supported in a relatively non-rotatable manner at a portion of the motor shaft positioned on an inner side in the width direction of the vehicle than the second vertical surface and a second motor case detachably connected to the second vertical surface so as to surround the second hydraulic motor main body. The pair of operational fluid passages fluidly connect the hydraulic motor main body and the second hydraulic motor main body to the hydraulic pump main body in parallel.

More preferably, the hydraulic pump unit includes a pump-side output adjusting member for changing the volume of the hydraulic pump main body, the hydraulic motor unit includes a fixed swash plate for keeping the volume of the hydraulic motor main body constant, and the second hydraulic motor unit includes a motor-side output adjusting member for changing the volume of the second hydraulic motor main body. The motor-side adjusting member is capable of adjusting the volume of the second hydraulic motor main body between a neutral state at which the volume of the second hydraulic motor main body is set substantially at zero and a maximum volume state at which the volume of the second hydraulic motor main body is changed to a maximum level in such a direction that the total volume of the hydraulic motor main body and the second hydraulic motor main body increases.

In each of the above various configurations, the wheel motor device may further include a communicating fluid passage formed in the port block so as to fluidly connect between the pump space and the motor space, and a discharge fluid passage having a first end fluidly connected to one of the pump space and the motor space and a second end opened outward.

According to the configuration, it is possible to omit a drain structure for the other of the pump space and the motor space.

More preferably, the port block is arranged with a bypass fluid passage fluidly connecting between the pair of operational fluid passages and a bypass valve capable of being externally operated so as to selectively have the bypass fluid passage in a fluidly-connecting state or a shutting-off state. The bypass valve fluidly connects the communicating fluid passage with the bypass fluid passage when having the bypass fluid passage in the fluidly-connecting state and fluidly disconnects the communicating fluid passage with the bypass fluid passage when having the bypass fluid passage in the shutting-off state.

Alternatively, in each of the above various configurations, the wheel motor device may further include a bypass fluid passage formed in the port block so as to fluidly connect between the pair of operational fluid passages; a drain fluid passage formed in the port block so as to have a first end fluidly connected to one of the pump space and the motor space; a bypass valve mounted to the port block in a state capable of being externally operated so as to selectively have the bypass fluid passage in a fluidly-connecting state or a shutting-off state, the bypass valve fluidly connecting the drain fluid passage with the bypass fluid passage when having the bypass fluid passage in the fluidly-connecting state and fluidly disconnecting the drain fluid passage with the bypass fluid passage when having the bypass fluid passage in the shutting-off state; a discharge fluid passage having a first end fluidly connected to the one of the pump space and the motor space and a second end opened outward; a self-suction fluid passage formed in the port block so as to have a first end fluidly connected to the other of the motor space and the pump space and a second end fluidly connected to at least one of the pair of operational fluid passages; and a self-suction check valve interposed in the self-suction fluid passage so as to allow the fluid to flow from the other of the motor space and the pump space to the corresponding operational fluid passage while preventing the reverse flow.

In each of the above various configurations, the motor case is preferably arranged with mounting portion for mounting the wheel motor device to a vehicle frame in a state where the pump case is free with respect to the vehicle frame.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENTS

First Embodiment

One preferred embodiment of a wheel motor device according to the present invention will now be described with reference to the accompanied drawings.

Figure 1:
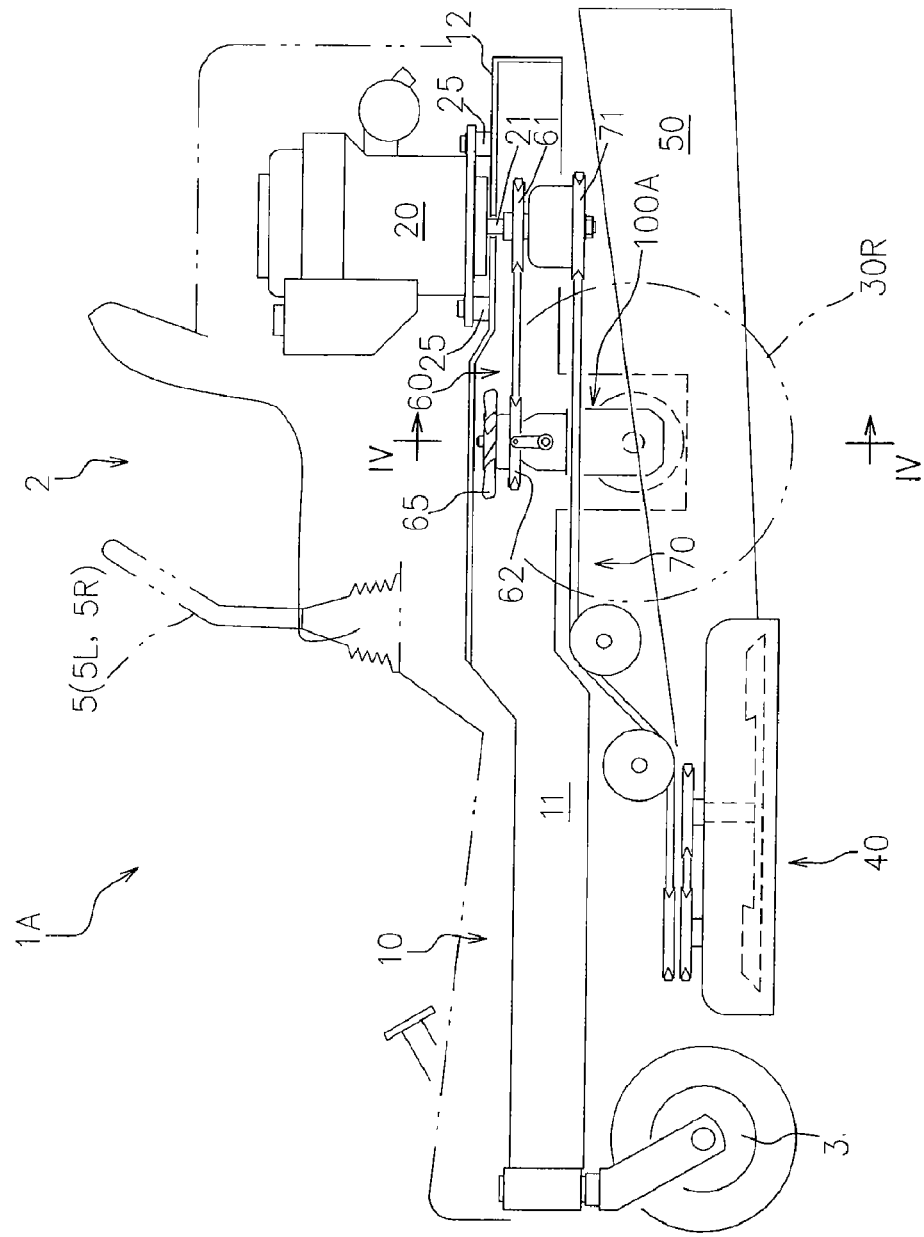
FIG. 1 is a side view of a working vehicle to which a wheel motor device according to a first embodiment of the present invention is applied.
Figure 2:
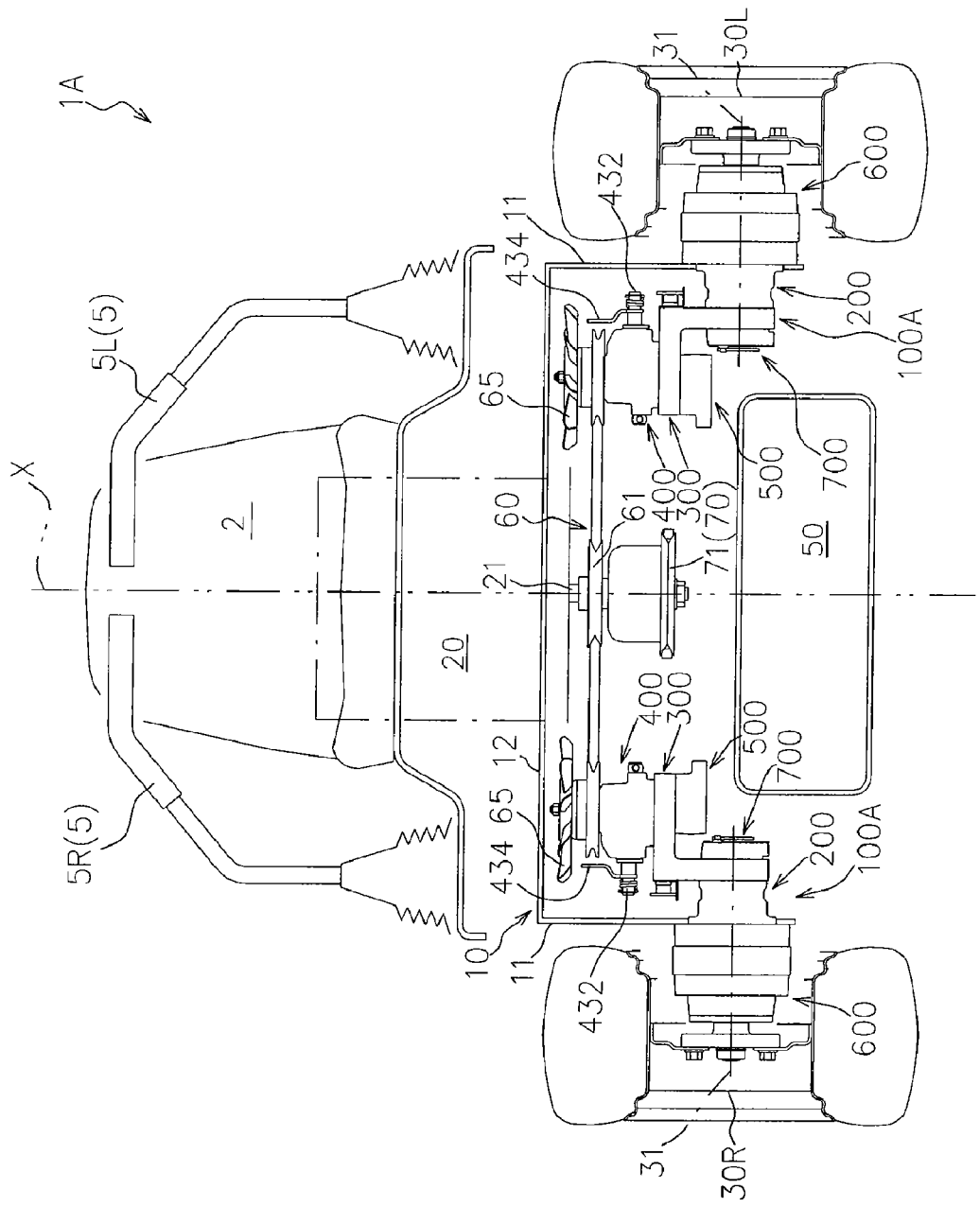
FIG. 2 is a plan view of the working vehicle shown in FIG. 1.
Figure 3:
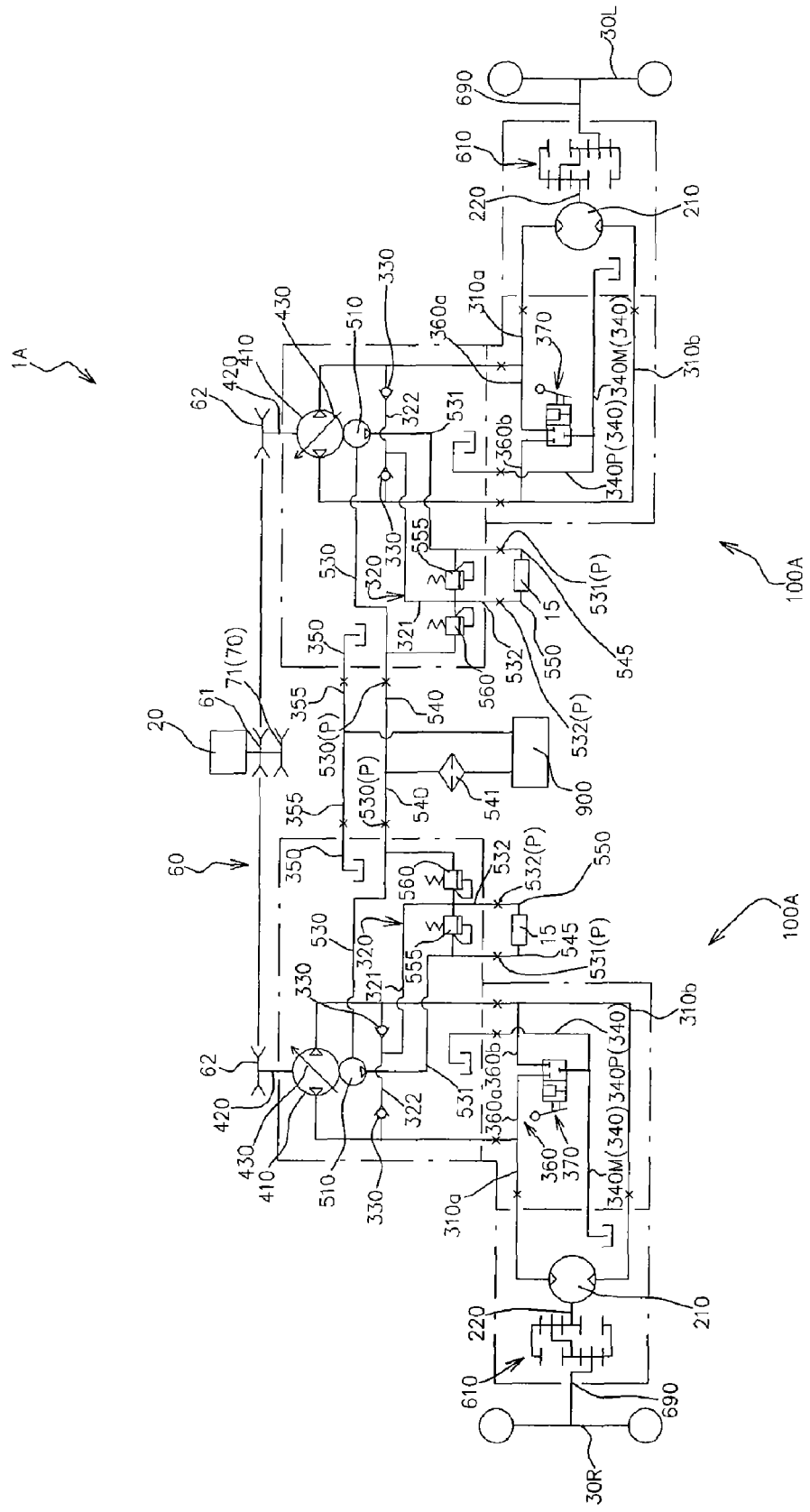
FIG. 3 is a hydraulic circuit diagram of the working vehicle shown in FIGS. 1 and 2.

FIGS. 1 to 3 respectively shows a side view, a plan view and a hydraulic circuit diagram of a working vehicle IA to which a wheel motor device 100A according to the present embodiment is applied.

The wheel motor device 100A according to the present embodiment includes a hydraulic motor unit 200 that has a hydraulic motor main body 210 forming an HST in cooperation with a hydraulic pump main body 410 and operatively driving a corresponding driving wheel 30 (see FIG. 3), and is capable of being arranged close to the corresponding driving wheel 30 (see FIG. 1).

The working vehicle will be firstly explained.

The working vehicle 1A includes, as shown in FIGS. 1 to 3, a vehicle frame 10 having a pair of main frames 11 that extends along a longitudinal direction of the vehicle and a cross member 12 that extends between the pair of main frames 11, an engine 20 functioning as a driving power source for the working vehicle 1A and supported by the vehicle frame 10, a pair of driving wheels 30 (a left-side driving wheel 30L and a right-side driving wheel 30R), and a pair of the wheel motor devices 100A configured so as to respectively drive the pair of driving wheels 30

The working vehicle 1A shown in FIGS. 1 to 3 further includes a pair of non-driving wheels 35 arranged on a side opposite the pair of driving wheels 30 in the longitudinal direction of the vehicle, a mower device 40 operatively driven by the engine 20, and a discharge duct 50 forming a conveying passage for conveying the grass mowed by the mower device 40 towards the rear side of the vehicle.

In the present embodiment, rear wheels are the driving wheels 30, and caster wheels forming front wheels are the non-driving wheels 35.

The engine 20 is supported by the vehicle frame 10 in a vibration-absorbing manner through vibration-absorbing rubbers 25, as shown in FIG. 1.

In the present embodiment, the engine 20 is of a vertical crank shaft type having an output shaft 21 that extends vertically, and is supported on an upper surface of the cross member 12 through the vibration-absorbing rubbers 25 in a state where a distal end of the output shaft 21 passes through an opening formed at the cross member 12 and reaches below the cross member 12.

A traveling system outputting pulley 61 forming a part of a traveling system pulley transmission mechanism 60 for transmitting a driving power to a pump shaft 420 which is described later, and a PTO system outputting pulley 71 forming a part of a PTO system pulley transmission mechanism 70 for transmitting a driving power to the mower device 40 are mounted to the output shaft 21.

The engine 20 may be of a horizontal crank shaft type instead of the vertical crank shaft type.

The pair of wheel motor devices 100A will now be explained.

The pair of wheel motor devices 100A are symmetric to each other with a virtual central vertical plane X (see FIG. 2), which is along a substantially vertical direction at a center in the width direction of the vehicle of the vehicle, as a reference.

Therefore, one (the wheel motor device 100A that is applied to the right-side driving wheel 30R) of the pair of wheel motor devices 100A will be hereinafter described.

Figure 4:
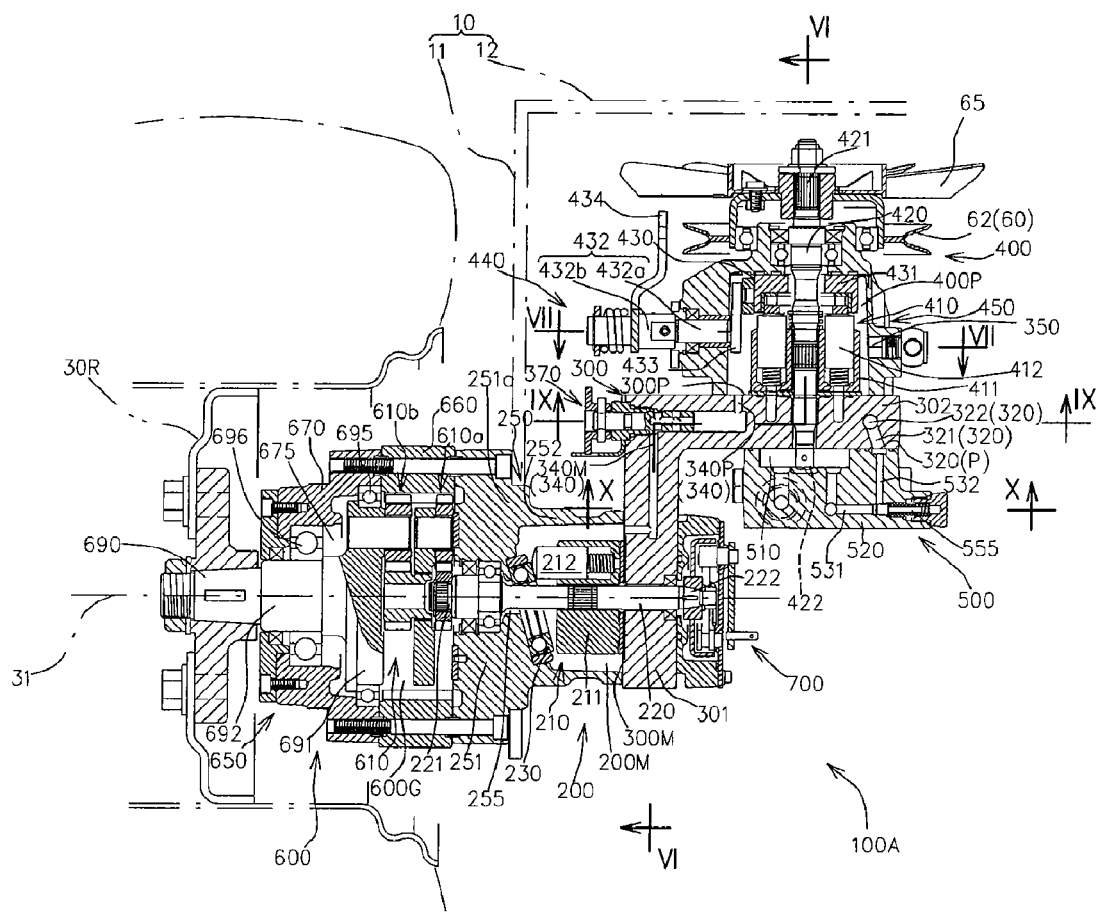
FIG. 4 is a vertical cross sectional front view taken along a line IV IV in FIG. 1.

FIG. 4 shows a vertical cross sectional front view of the wheel motor device 100A taken along a line IV IV in FIG. 1.

The wheel motor device 100A includes the hydraulic motor unit 200, as described above.

The hydraulic motor unit 200 includes, as shown in FIGS. 3 and 4, the hydraulic motor main body 210 forming the HST in cooperation with the hydraulic pump main body 410 operatively driven by the engine 20, a motor shaft 220 supporting the hydraulic motor main body 210 in a relatively non-rotatable manner, a motor case 250 surrounding the hydraulic motor main body 210, and a port block 300 detachably connected to the motor case 250.

The port block 300 has a motor surface 300M to which the motor case 250 is connected so as to form a motor space 200M for accommodating the hydraulic motor main body 210, and a pump surface 300 P to which a pump case 450, which surrounds the hydraulic pump main body 410, is connected so as to form a pump space 400P for accommodating the hydraulic pump main body 410, as shown in FIG. 4.

That is, in the wheel motor device 100A according to the present embodiment, the port block 300 is configured so as to support the hydraulic motor main body 210 in cooperation with the motor case 250, and also support the hydraulic pump main body 410 in cooperation with the pump case 450.

Further, the port block 300 is formed with a pair of first and second operational fluid passages 310a, 310b for fluidly connecting the hydraulic motor main body 210 that is accommodated in the motor space 200M while being contacted with the motor surface 300M in a sliding manner around its axis line and the hydraulic pump main body 410 that is accommodated in the pump space 400P while being contacted with the pump surface 300P in a sliding manner around its axis line, as shown in FIG. 3.

Fluid passages formed in the port block 300 including the pair of the operational fluid passages 310a, 310b will be described later.

As described above, in the wheel motor device 100A according to the present embodiment, the port block 300 supporting the hydraulic motor main body 210 and the motor case 250 is configured so as to also support the hydraulic pump main body 410 and the pump case 450. Therefore, it is not necessary to attach the hydraulic pump main body 410 to the vehicle main body independently of the wheel motor device 100A.

Accordingly, the wheel motor device 100A could enhance attachment workability of the hydraulic motor main body 210 and the hydraulic pump main body 410 to the vehicle main body, while achieving an effect of securing a free space between the pair of driving wheels 30L, 30R.

Further, in the wheel motor device 100A according to the present embodiment, since the port block 300 is formed with the pair of operational fluid passages 310 for fluidly connecting the hydraulic pump main body 410 and the hydraulic motor main body 210, it is not necessary to fluidly connect the hydraulic pump main body 410 and the hydraulic motor main body 210 through an external conduit. Therefore, the wheel motor device 100A could achieve assembly work with improved efficiency and reduced cost thanks to omission of the external conduit.

Furthermore, in the present embodiment, it is possible to perform an adjustment work of the HST formed by the hydraulic pump main body 410 and the hydraulic motor main body 210 without actually attaching these main bodies 410, 210 to the vehicle main body and with a condition corresponding to the usage condition, thereby improving efficiency of the adjustment work of the HST.

In particular, in a case where the hydraulic equipment manufacturing company manufactures the hydraulic pump main body and the hydraulic motor main body that forms the HST, and the vehicle manufacturing company attaches these main bodies to the vehicle main body to complete the working vehicle, the wheel motor device 100A allows the hydraulic equipment manufacturing company to carry out the adjustment work of the hydraulic pump main body and the hydraulic motor main body in a condition corresponding to a vehicle-mounted condition before shipment of the hydraulic pump main body and the hydraulic motor main body. Therefore, the vehicle manufacturing company could assemble the traveling hydrostatic transmission to the vehicle main body, only with an extremely simple work of attaching the wheel motor device 100A to the vehicle main body.

In the present embodiment, the port block 300 integrally includes a vertical portion 301 and a horizontal portion 302, as shown in FIG. 4. The vertical portion 301 extends substantially vertically so as to be orthogonal to a rotational axis line 31 of the corresponding driving wheel 30R. The horizontal portion 302 extends substantially horizontally from the vertical portion 301 so as to be above the motor shaft 220.

In the configuration, an outer surface of the vertical portion 301 facing outward in the width direction of the vehicle forms the motor surface 300M, and an upper surface of the horizontal portion 302 forms the pump surface 300P.

The horizontal portion 302 preferably extends in a substantially horizontal direction from an upper end of the vertical portion 301.

The configuration makes it possible to have the hydraulic pump main body 410 and the pump case 450 supported by the port block 300 while effectively securing the free space between the pair of driving wheels 30L, 30R at an area near the rotational axis line 31 with respect to an up-and-down position. In the present embodiment, the discharge duct 50 is arranged in the free space.

Specifically, the horizontal portion 302 extends inward in the width direction of the vehicle from the upper end of the vertical portion 301, as shown in FIG. 4, in the present embodiment.

The motor case 250 includes, as shown in FIG. 4, an end wall 251 positioned outward in the width direction of the vehicle than the motor surface 300M and facing the motor surface 300M, and a peripheral wall 252 extending inward in the width direction of the vehicle from a peripheral edge of the end wall 251. The motor case 250 is formed with an opening at an inner end in the width direction of the vehicle, the opening has a size for allowing the hydraulic motor main body 210 to be passed therethrough.

The motor case 250 is connected to the motor surface 300M of the port block 300 such that the opening is closed by the motor surface 300M, whereby the end wall 251, the peripheral wall 252 and the motor surface 300M of the port block 300 forms the motor space 200M.

The motor shaft 220 is supported by the motor case 250 and the port block 300 in a rotatable manner around its axis line while supporting the hydraulic motor main body 210 in a relatively non-rotatable manner within the motor space 200M.

In the present embodiment, the motor shaft 220 is supported by the motor case 250 and the port block 300 in a state of extending substantially horizontally so as to be positioned coaxially with the rotational axis line 31 of the corresponding driving wheel 30R, as shown in FIG. 4.

Specifically, the motor shaft 220 has a first end 221 (an outer end in the width direction of the vehicle) extending outward in the width direction of the vehicle from the end wall 251, the first end 221 forming an output end.

In the present embodiment, the motor shaft 220 has a second end 222 (an inner end in the width direction of the vehicle) opposite the first end 221, the second end 222 extending inward in the width direction of the vehicle from the port block 300 such that a brake unit 700, which is described later, acts on the second end 222.

The hydraulic motor main body 210 is supported by the motor shaft 220 in a relatively non-rotatable manner in a state of contacting in a sliding manner around its axis line with the motor surface 300M.

Specifically, the hydraulic motor main body 210 includes a motor side cylinder block 211 supported by the motor shaft 220 in a relatively non rotatable manner, and a plurality of motor-side pistons 212 accommodated in the motor-side cylinder block 211 in a relatively non-rotatable manner around the axis line and in a reciprocating manner along the axis line.

At least one of the hydraulic motor main body 210 and the hydraulic pump main body 410 is of a variable displacement type so as to form the HST in cooperation with each other.

In the present embodiment, the hydraulic pump main body 410 is of a variable displacement type and the hydraulic motor main body 210 is of a fixed displacement type, as shown in FIGS. 3 and 4.

Accordingly, the hydraulic motor unit 200 includes, in addition to the above configurations, a fixed swash plate 230 directly or indirectly contacting with free ends of the motor-side pistons 212 to form a reciprocating range of the motor-side pistons 212.

Figure 5:
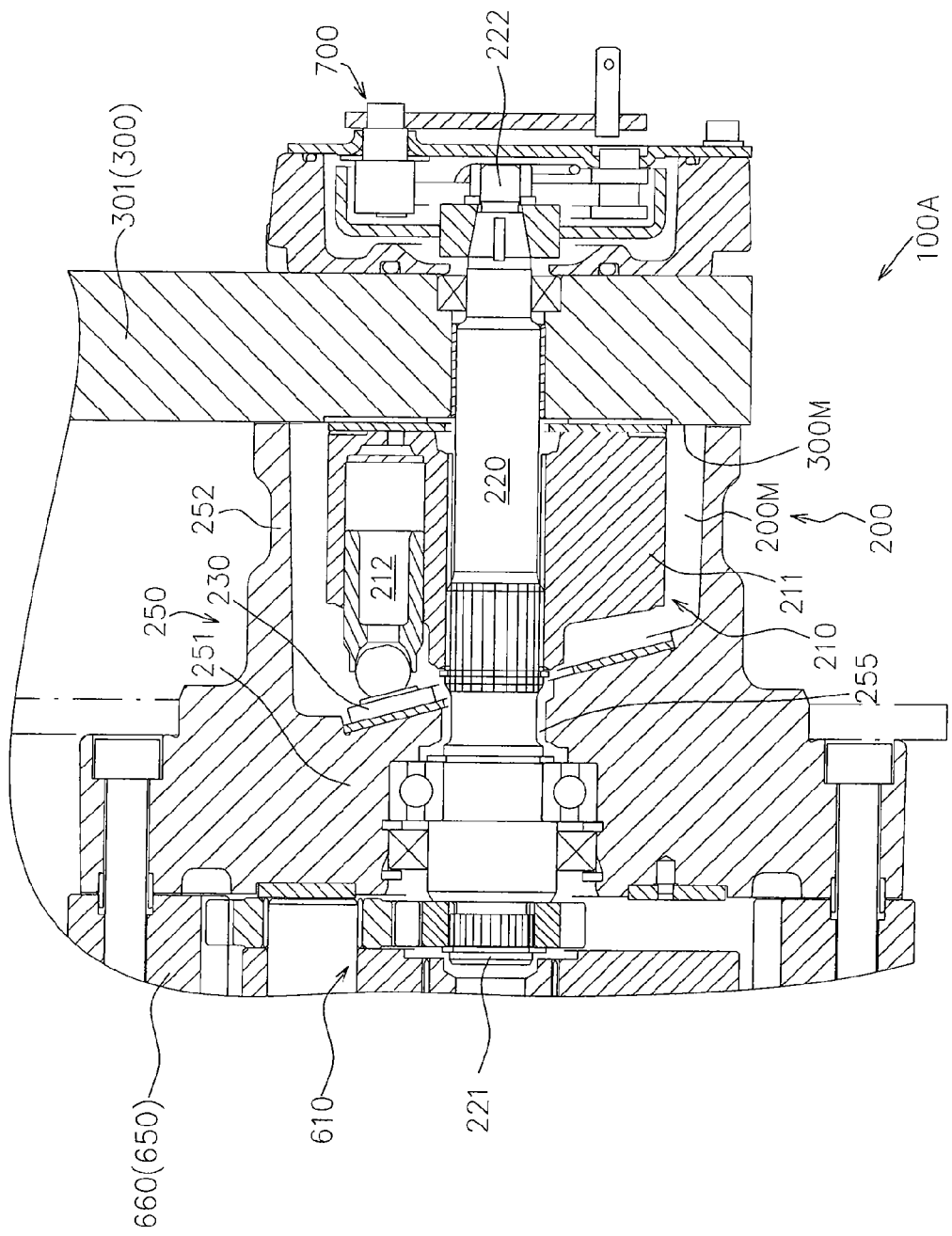
FIG. 5 is a vertical cross sectional partial side view of a modified hydraulic motor unit provided in the wheel motor device according to the first embodiment.

In the present embodiment, the motor-side piston 212 is of a shoeless type in which the free end of the piston 212 directly contacts with the fixed swash plate 230, as shown in FIG. 4. Alternatively, the motor-side piston 212 may be of a shoe type in which the free end of the piston 212 engages with the fixed swash plate 230 through a shoe, as shown in FIG. 5.

As described above, the port block 300 is configured to accommodate the hydraulic pump main body 410 in cooperation with the pump case 450 in the present embodiment.

Specifically, the wheel motor device 100A according to the present embodiment includes, in addition to the hydraulic motor unit 200, a hydraulic pump unit 400 including the pump case 450 and the hydraulic pump main body 410, as shown in FIGS. 3 and 4.

Figure 6:
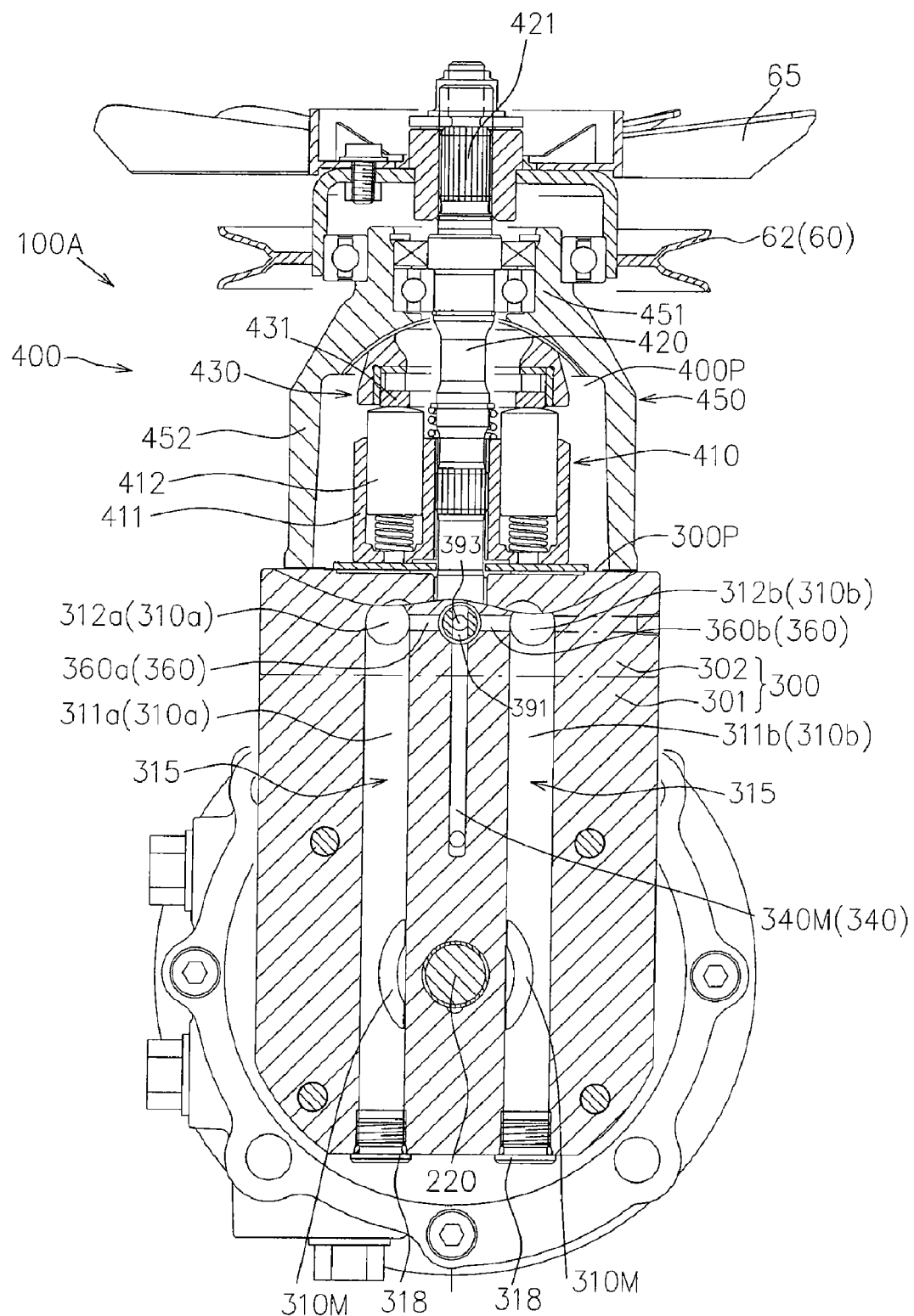
FIG. 6 is a cross sectional view taken along a line VI-VI in FIG. 4.

FIG. 6 shows a cross sectional view taken along a line VI-VI in FIG. 4.

As shown in FIGS. 3, 4 and 6, the hydraulic pump unit 400 includes a pump shaft 420 operatively driven by the engine 20, the hydraulic pump main body 410 supported by the pump shaft 420 in a relatively non-rotatable manner, and the pump case 450 forming the pump space 400P for accommodating the hydraulic pump main body 410 in cooperation with the port block 300.

As shown in FIGS. 4 and 6, the pump case 450 includes an end wall 451 positioned above the pump surface 300P and facing the pump surface 300P, and a peripheral wall 452 extending downward from a peripheral edge of the end wall 451. The peripheral wall 452 is formed with an opening at an end opposite the end wall 452, the opening has a size for allowing the hydraulic pump main body 410 to be passed therethrough.

The pump case 450 is connected to the pump surface 300P of the port block 300 such that the opening is closed by the pump surface 300P, whereby the end wall 451, the peripheral wall 452 and the pump surface 300P of the port block 300 forms the pump space 400P.

The pump shaft 420 is supported by the pump case 450 and the port block 300 in a rotatable manner around its axis line while supporting the hydraulic pump main body 410 in a relatively non-rotatable manner within the pump space 400P.

In the present embodiment, the pump shaft 420 is supported by the pump case 450 and the port block 300 so as to be along the substantially vertical direction, as shown in FIGS. 4 and 6.

Specifically, the pump shaft 420 has a first end 421 extending outward from one of the pump case 450 and port block 300, the first end 421 forming an input end.

In the present embodiment, the first end 421 of the pump shaft 420 projects upward from the end wall 451 of the pump case 450 such that a traveling system inputting pulley 62 of the traveling system pulley transmission mechanism 60 is mounted on the first end 421.

In the present embodiment, a cooling fan 65 is also mounted on the first end 421 of the pump shaft 420, as shown in FIGS. 4 and 6.

As shown in FIGS. 4 and 6, the pump shaft 420 has a second end 422 opposite the first end 421, the second end 422 extending outward from the other (the port block 300 in the present embodiment) of the pump case 450 and the port block 300.

The second end 422 of the pump shaft 420 operatively drives an auxiliary pump main body 510 of an auxiliary pump unit 500, which is described later.

The hydraulic pump main body 410 is supported by the pump shaft 420 in a relatively non-rotatable manner in a state of contacting with the pump surface 300P in a sliding manner around its axis line, as shown in FIGS. 4 and 6.

Specifically, the hydraulic pump main body 410 includes a pump-side cylinder block 411 supported by the pump shaft 420 in a relatively non-rotatable manner, and a plurality of pump-side pistons 412 accommodated in the pump-side cylinder block 411 in a relatively non-rotatable manner around the axis line and in a reciprocating manner along the axis line.

As described above, the hydraulic pump main body 410 is of a variable displacement type in the present embodiment.

Accordingly, the hydraulic pump unit 400 includes, in addition to the above configurations, an output adjusting member 430 for changing suction/discharge amount of the hydraulic pump main body 410.

Figure 7:
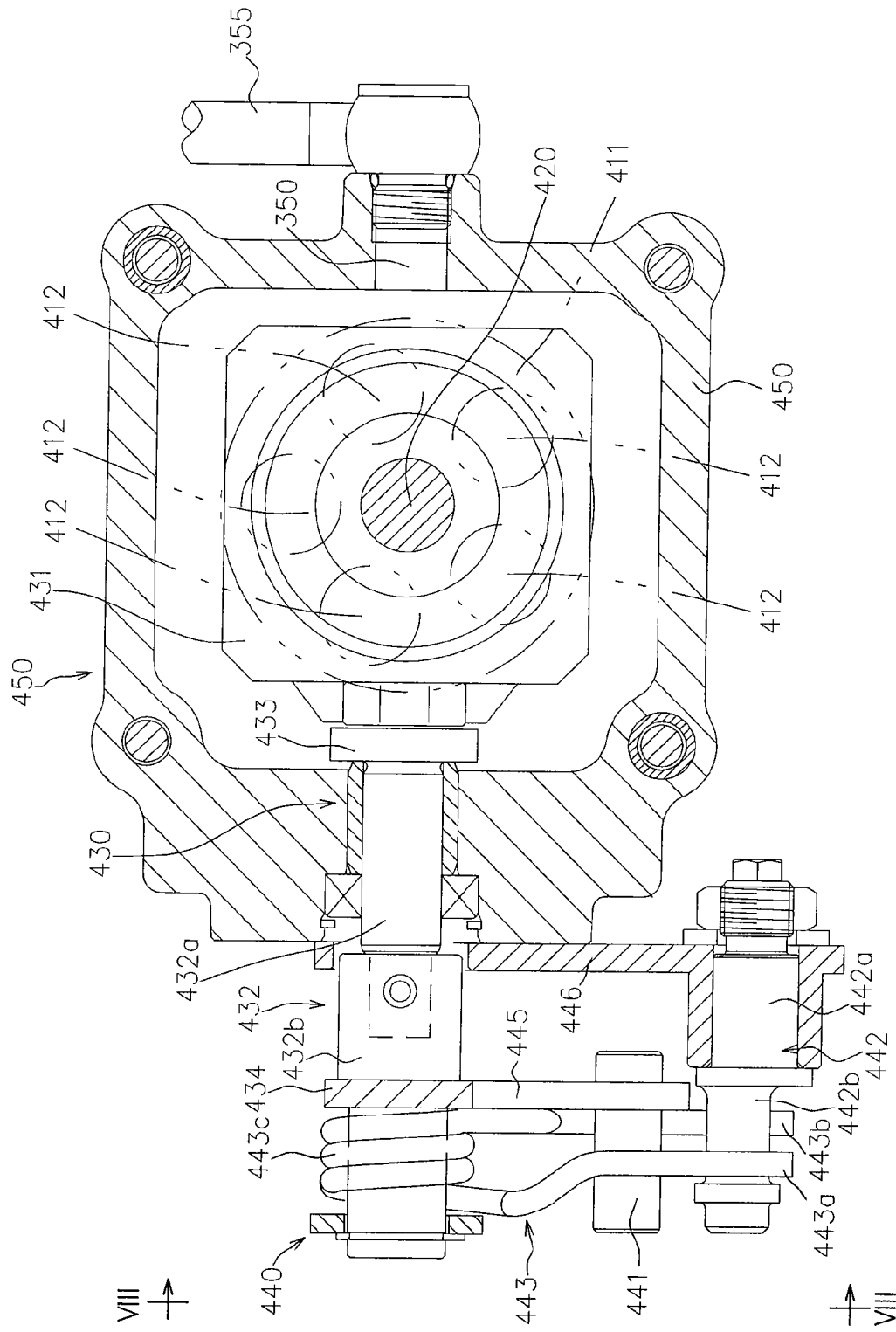
FIG. 7 is a cross sectional view taken along a line VII-VII in FIG. 4.

FIG. 7 shows a cross sectional view taken along a line VII-VII in FIG. 4.

As shown in FIGS. 4 and 7, the output adjusting member 430 includes a movable swash plate 431 directly or indirectly contacting with free ends of the pump-side pistons 412 to define a reciprocating range of the pump-side pistons 412, and a control shaft 432 capable of being externally operated to slant the movable swash plate 431.

In the present embodiment, the output adjusting member 430 is of a cradle type in which the movable swash plate 431 and the control shaft 432 are connected to each other through a connecting arm 433, as shown in FIGS. 4 and 7. Alternatively, it is of course possible that the output adjusting member 430 is of a trunnion type in which the movable swash plate 431 and the control shaft 432 are integrally formed.

The control shaft 432 is supported by the pump case 450 in a rotatable manner around its axis line, and the movable swash plate 431 slants in response to a rotation of the control shaft 432 around its axis line.

As shown in FIGS. 2 and 4, a control arm 434 is connected to an outward extending end of the control shaft 432 in a relatively non-rotatable manner. The control arm 434 has a free end connected, by way of a suitable connecting mechanism (not shown), to an operating member arranged in the vicinity of a driver's seat 2 (see FIGS. 1 and 2).

In the present embodiment, the working vehicle 1A includes left-side and right-side operating members 5L, 5R as the operating member 5. The control arm 434 of the wheel motor device 100A corresponding to the left-side driving wheel 30L is operatively connected to the left-side operating member 5L, and the control arm 434 of the wheel motor device 100A corresponding to the right-side driving wheel 30R is operatively connected to the right-side operating member 5R.

In the present embodiment, the control shaft 432 includes a shaft main body 432a supported by the pump case 450 in a rotatable manner around its axis line, and an extending portion 432b connected to an outer end of the shaft main body 432a in a relatively non-rotatable manner around its axis line. The control arm 434 is connected to the extending portion 432b in a relatively non-rotatable manner.

In the present embodiment, the pump-side piston 412 is of a shoeless type in which the free end of the piston 412 directly contacts with the movable swash plate 431 (see FIGS. 4 and 6). Alternatively, the pump-side piston 412 may be of a shoe type in which the free end of the piston 412 engages with the movable swash plate 431 through a shoe.

In the present embodiment, the hydraulic pump unit 400 includes, in addition to the above configurations, a neutral-position return mechanism 440 for returning the movable swash plate 431 to a neutral position when an external operating force on the control shaft 432 is released.

Figure 8:
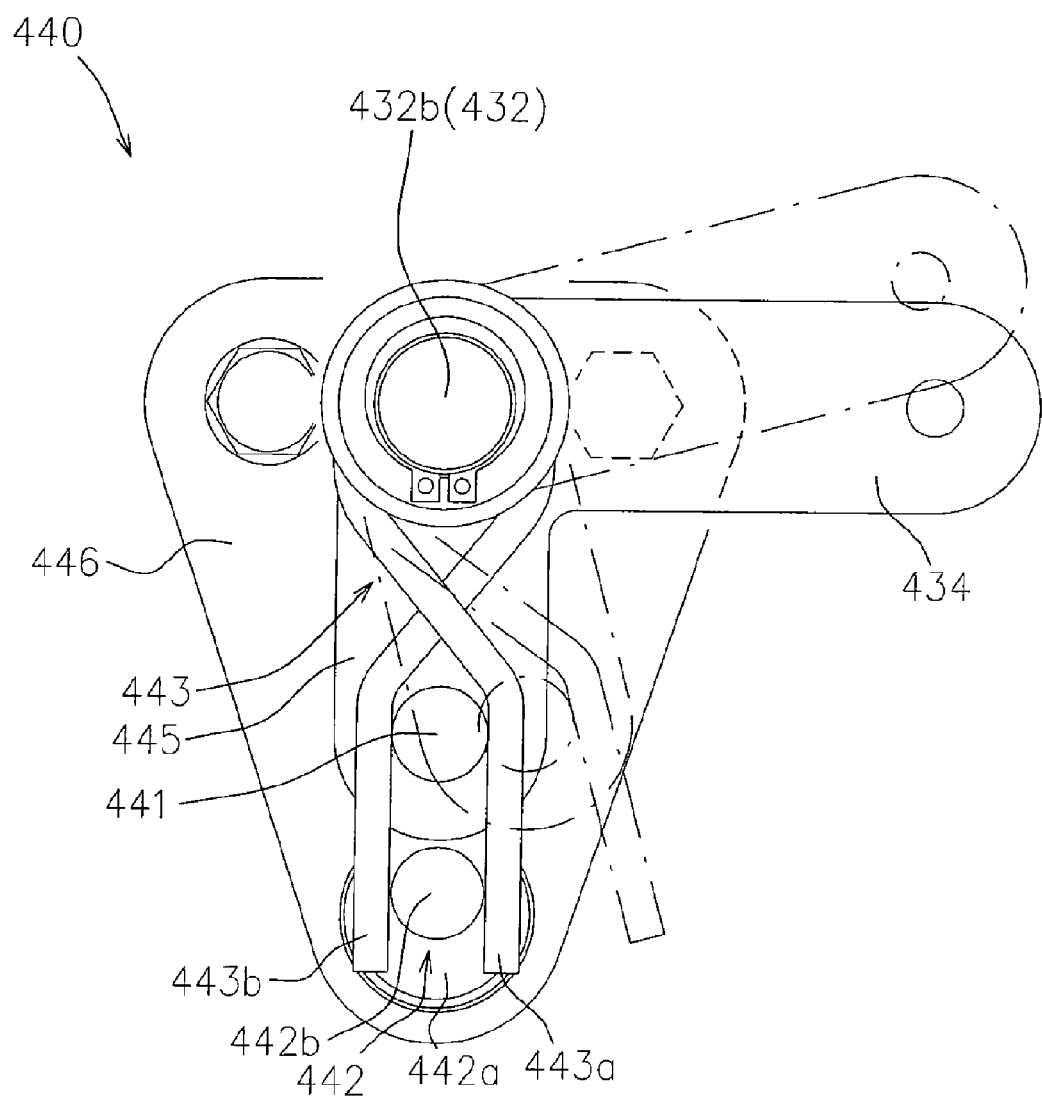
FIG. 8 is an end view taken along a line VIII-VIII in FIG. 7.

FIG. 8 shows an end view of the neutral position return mechanism 440 taken along a line VIII-VIII in FIG. 7.

The neutral-position return mechanism 440 includes a movable pin 441 that swings around the axis line of the control shaft 432 in conjunction with the rotation of the control shaft 432 around the axis line, and a fixed pin 442 that is fixed with respect to the position around the axis line of the control shaft 432, and a neutral spring 443 that engages with the movable pin 441 and the fixed pin 442, as shown in FIGS. 7 and 8.

The movable pin 441 is arranged at a free end side of a swing arm 445 that has a proximal end supported by the control shaft 432 in a relatively non-rotatable manner.

In the present embodiment, the swing arm 445 is integrally formed with the control arm 434.

The fixed pin 442 is supported by a base plate 446 that is connected to the pump case 450.

The neutral spring 443 is a helical spring including a central portion 443c wound around the control shaft 432, and first and second end portions 443a, 443b extending outward in a radial direction from the central portion 443.

Specifically, the neutral spring 443 is wound around the control shaft 432 such that the movable pin 441 and the fixed pin 442 are positioned between the first and second end portions 443a, 443b.

The thus configured neutral-position return mechanism 440 operates as follows.

When the control shaft 432 is rotated around its axis line based on the external operation, the movable pin 441 presses one of the first and second end portions 443a, 443b in a state where the fixed pin 442 locks the other of the first and second end portions 443a, 443b at its initial position, whereby the elastic force retained in the neutral spring 443 increases.

That is, when the control shaft 432 is rotated in either one direction of the both directions around its axis line by the external operation, the elastic force retained in the central portion 443c of the neutral spring 443 increases in response to the rotational amount of the control shaft 432. In this state, if the external operation is released, the control shaft 432 is rotated around its axis line by the elastic force retained in the neutral spring 443 such that the movable pin 441 returns to the initial position, whereby the movable swash plate 431 returns to the neutral position.

The fixed pin 442 preferably has an eccentric structure including a proximal end portion 442a which is supported by the base plate 446 and an engaging portion 442b which extends from the proximal end portion 442a and with which the first and second end portions 443a, 443b of the neutral spring 443 engage, the proximal end portion 442a and the engaging portion 442b being eccentric to each other.

With this arrangement, the rotation of the proximal end portion 442a around its axis line makes it possible to easily change the circumferential position of the engaging portion 442b around the axis line of the control shaft 432. Therefore, it is possible to easily adjust the circumferential position of the engaging portion 442b of the fixed pin 442 to the position corresponding to the neutral position of the movable swash plate 431.

In the present embodiment, the wheel motor device 100A further includes the auxiliary pump unit 500, as shown in FIGS. 2 and 4.

The auxiliary pump unit 500 includes the auxiliary pump main body 510 driven by the second end 422 of the pump shaft 420, and an auxiliary pump case 520 connected to a lower surface of the port block 300 so as to surround the auxiliary pump main body 510.

The auxiliary pump main body 510 functions as a hydraulic pressure source for a hydraulic device 15 (for example, a hydraulic lifting device for elevating the mower device 40) provided in the working vehicle 1A as well as a charge oil source for the HST formed by the hydraulic pump main body 410 and the hydraulic motor main body 210, as shown in FIG. 3.

The auxiliary pump case 520 is formed with various fluid passages, which are described later.

The wheel motor device 100A further includes a reduction gear unit 600 for reducing the speed of the rotational power output from the hydraulic motor main body 210 and outputting the rotational power whose speed is reduced toward the corresponding driving wheel 30R, as shown in FIGS. 2 and 4.

The arrangement of the reduction gear unit 600 makes it possible to utilize a high-speed/ low-torque type hydraulic motor main body as the hydraulic motor main body 210. Therefore, it is possible to miniaturize the hydraulic motor main body 210 and also reduce the leak amount of the operational fluid from the hydraulic motor main body 210, thereby improving transmission efficiency of the HST.

Specifically, the reduction gear unit 600 includes, as shown in FIGS. 3 and 4, a reduction gear mechanism 610 for reducing the speed of the rotational power output by the motor shaft 220, an output member 690 for outputting the rotational power whose speed is reduced by the reduction gear mechanism 610, and a gear case 650 detachably connected to the motor case 250 so as to accommodate the reduction gear mechanism 610.

In the present embodiment, the reduction gear mechanism 610 includes first and second planetary gear mechanism 610a, 610b that are arranged in series to each other.

Specifically, the motor case 250 is formed with a through hole 255 (see FIG. 4) for allowing the first end 221 (an outer end de in the width direction of the vehicle in the present embodiment) of the motor shaft 220 to project outward from the motor case 250. The reduction gear mechanism 610 is configured so as to reduce the speed of the rotational power from the first end 221 of the motor shaft 220.

An oil seal member is arranged in the through hole 255 in addition to a bearing member for supporting the motor shaft 220 in a rotatable manner around its axis line. The oil seal member separates a gear space 600G that is defined by the gear case 650 from the motor space 200M in a liquid-tight manner.

The separation between the motor space 200M and the gear space 600G in a liquid-tight manner makes it possible to use one oil having viscosity suitable for the operational fluid of the HST formed by the hydraulic motor main body 210 and the hydraulic pump main body 410, and the other oil having viscosity suitable for the lubrication of the reduction gear mechanism 610.

The first planetary gear mechanism 610a includes a first sun gear supported in a relatively non-rotatable manner on the first end 221 of the motor shaft 220, a first planetary gear that meshes with the first sun gear so as to revolve around the first sun gear, a first carrier that supports the first planetary gear in a relatively rotatable manner and that revolves around the first sun gear along with the first planetary gear, and a first internal gear that meshes with the first planetary gear.

The second planetary gear mechanism 610b includes a second sun gear operatively connected to the first sun gear, a second planetary gear that meshes with the second sun gear so as to revolve around the second sun gear, a second carrier that supports the second planetary gear in a relatively rotatable manner and that revolves around the second sun gear along with the second planetary gear, and a second internal gear that meshes with the second planetary gear.

In the present embodiment, the gear case 650 includes a first gear case 660 connected to the motor case 250, and a second gear case 670 connected to the motor case 250 with sandwiching the first gear case 660 between the motor case 250 and the second gear case 670.

The first gear case 660 has a hollow shape in which both an inner side in the width direction of the vehicle contacting with the motor case 250 and an outer side in the width direction of the vehicle opposite to the motor case 250 are opened, and has an inner circumferential surface with which the first and second internal gears are integrally formed.

The second gear case 670 has a hollow shape in which an inner side in the width direction of the vehicle contacting with the first gear case 660 is opened and an outer side in the width direction of the vehicle opposite to the first gear case 660 is closed by an end wall.

The end wall of the second gear case 670 is formed with a through hole 675 through which the output member 690 extends outward.

The output member 690 includes, as shown in FIG. 4, a flange portion 691 connected to the second carrier so as to rotate around its axis line in accordance with the revolution of the second carrier around the second sun gear, and an output shaft portion 692 extending outward in the width direction of the vehicle from the flange portion 691.

In the present embodiment, the output member 690 is supported at two points by first and second bearing member 695, 696 such that the output member 690 can be stably rotated around its axis line. The first bearing member 695 is arranged between an inner circumferential surface of the second gear case 670 and an outer circumferential surface of the flange portion 691. The second bearing member 696 is arranged between an inner circumferential surface of the through hole 675, which is formed at the end wall of the second gear case 670, and an outer circumferential surface of the output shaft portion 692.

In the present embodiment, the wheel motor device 500 further includes a brake unit 700, as shown in FIGS. 2 and 4.

The brake unit 700 is configured so as to apply the brake force on the motor shaft 220 positioned on an upstream side in the power transmission direction than the reduction gear mechanism 610.

Specifically, the brake unit 700 is connected to the inner surface of the port block 300 facing inward in the width direction of the vehicle so as to selectively apply the brake force on the second end 222 of the motor shaft 220 based on the external operation.

In the present embodiment, the brake unit 700 is an inward-expanding drum brake that is internally mounted to a brake case, but in place thereof, may be a band brake having a drum-shaped brake rotor exposed to the outside of the brake case or may be a disc brake.

The fluid passages formed in the port block 300 and the auxiliary pump case 520 will now be explained.

Figure 9:
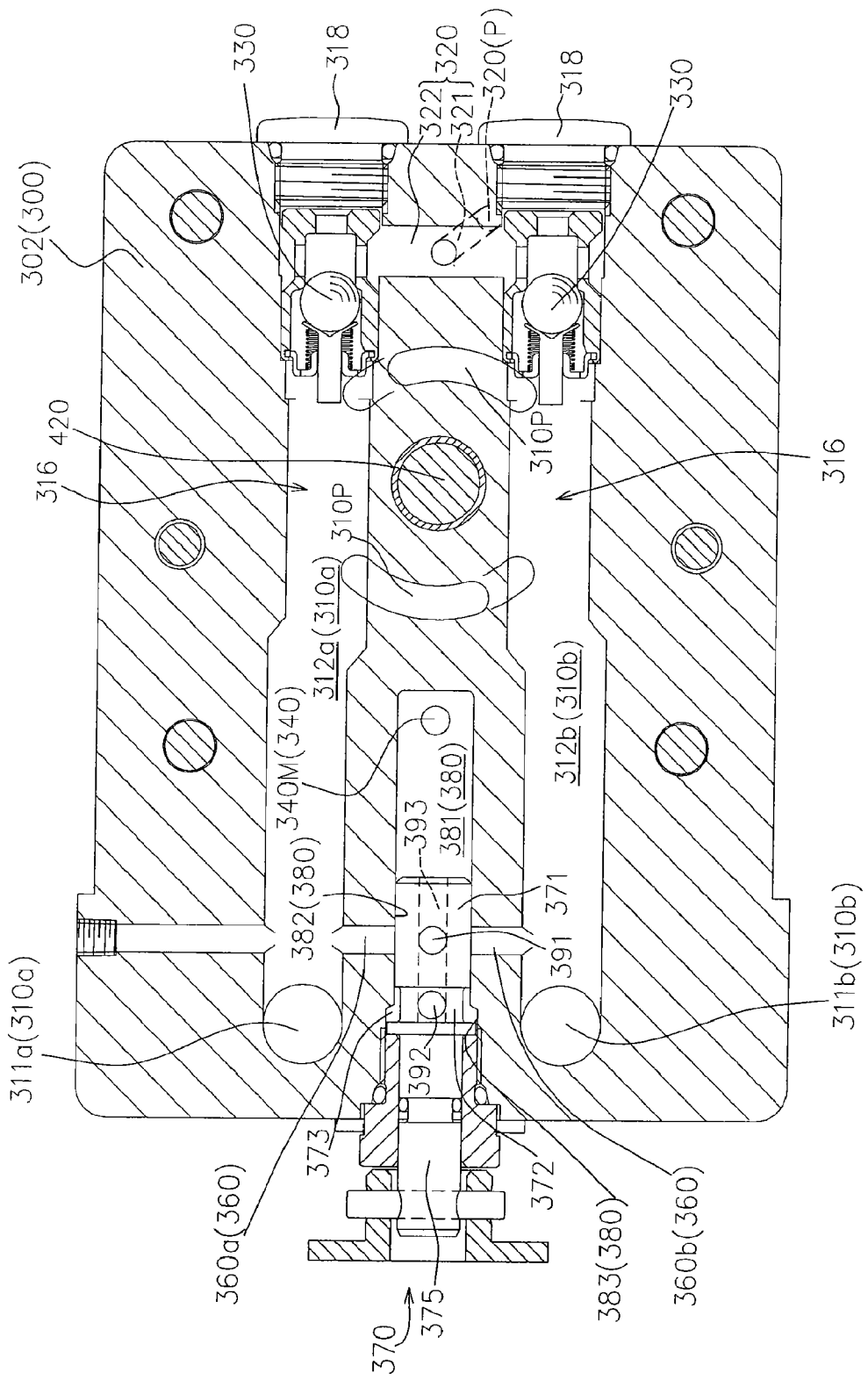
FIG. 9 is a cross sectional view taken along a line IX-IX in FIG. 4.

FIG. 9 shows a cross sectional view of the port block 300 taken along a line IX-IX in FIG. 4.

Figure 10:
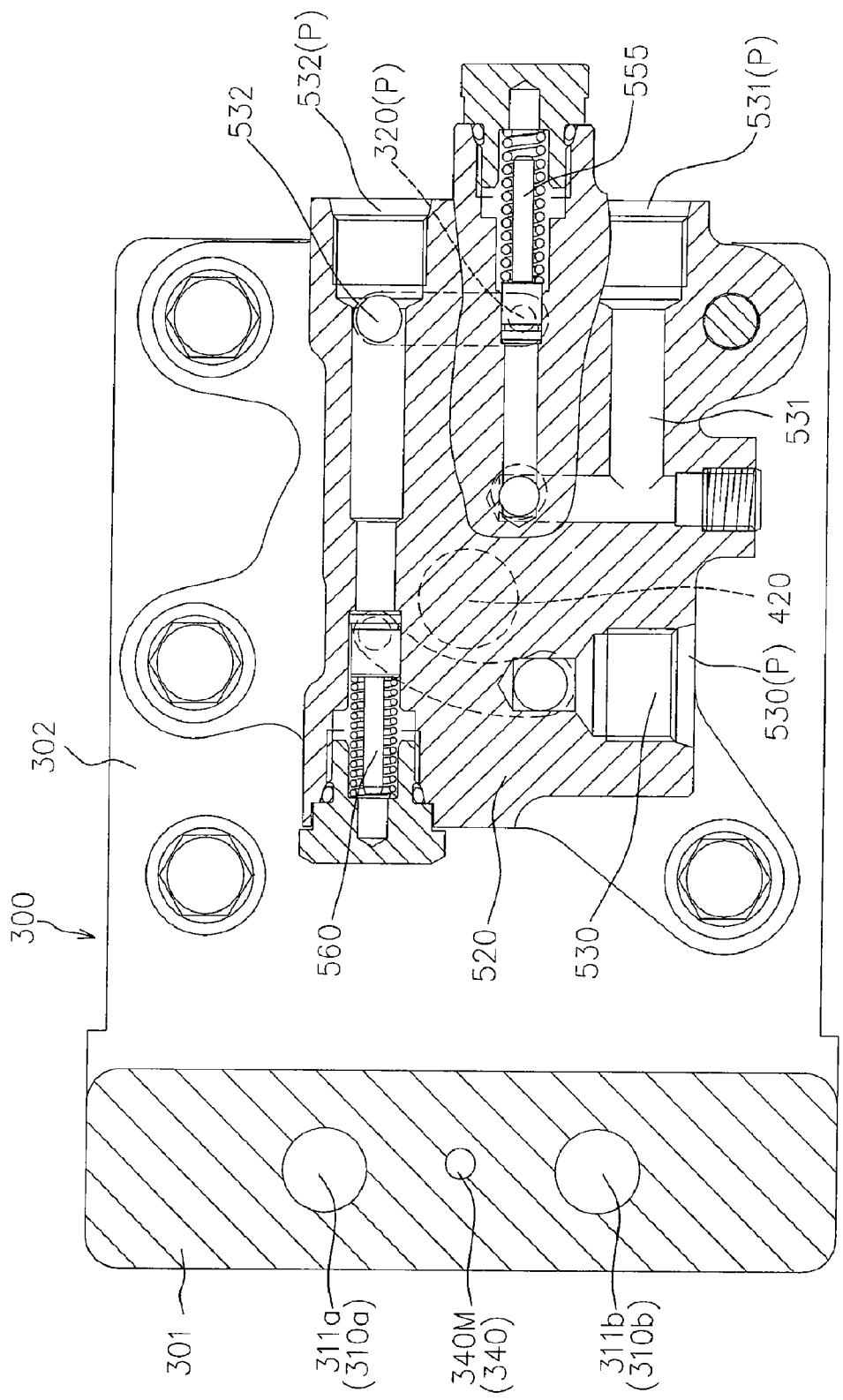
FIG. 10 is a cross sectional view taken along a line X-X in FIG. 4.

FIG. 10 shows a cross sectional view of the auxiliary pump case 520 taken along a line X-X in FIG. 4.

As shown in FIGS. 3 and 9, the port block 300 is formed with the pair of operational fluid passages 310a, 310b for fluidly connecting the hydraulic pump main body 410 that is accommodated in the pump space 400P while being contacted with the pump surface 300P in a sliding manner around its axis line and the hydraulic motor main body 210 that is accommodated in the motor space 200M while being contacted with the motor surface 300M in a sliding manner around its axis line.

One (for example, the first operational fluid passage 310a) of the pair of the operational fluid passages 310a, 310b becomes high-pressure at a forward travel of the vehicle, and the other (for example, the second operational fluid passage 310b) becomes high-pressure at a rearward travel of the vehicle.

The pair of operational fluid passages 310a, 310b have first end sides opened to the pump surface 300P through a pair of pump-side portings such as a pair of pump-side kidney ports 310P (see FIG. 9), and second end sides opened to the motor surface 300M through a pair of motor-side portings such as a pair of motor-side kidney ports 310M (see FIG. 6).

Specifically, the pair of operational fluid passages 310a, 310b include, as shown in FIGS. 6 and 9, a pair of pump-side operational fluid passages 312a, 312b that are formed in the horizontal portion 302 so as to extend in parallel to each other with sandwiching the pump shaft 420 therebetween, and a pair of motor-side operational fluid passages 311a, 311b that are formed in the vertical portion 301 so as to extend in parallel to each other with sandwiching the motor shaft 220 therebetween.

The pair of pump-side operational fluid passages 312a, 312b are opened to the pump surface 300P through the pair of pump-side kidney ports 310P.

Specifically, the horizontal portion 302 is formed with a pair of pump-side perforated bores 316 forming the pair of pump-side operational fluid passages 312a, 312b, as shown in FIG. 9. The pair of pump-side perforated bores 316 are respectively positioned at front and rear sides in the longitudinal direction of the vehicle with the pump shaft 420 as a reference, and include inner ends in the width direction of the vehicle opened to the outside and outer ends in the width direction of the vehicle terminated with in the port block 300.

The pair of pump-side perforated bores 316 includes the inner ends in the width direction of the vehicle closed by caps 318, and intermediate areas between the inner ends and the outer ends opened to the pump surface 300P through the pair of pump-side kidney ports 310P.

The pair of motor-side operational fluid passages 311a, 311b are fluidly connected to the pair of pump-side operational fluid passages 312a, 312b, and opened to the motor surface 300M through the pair of motor-side kidney ports 310M.

Specifically, the vertical portion 301 is formed with a pair of motor-side perforated bores 315 forming the pair of motor-side operational fluid passages 311a, 311b, as shown in FIG. 6. The pair of motor-side perforated bores 315 are respectively positioned at front and rear sides in the longitudinal direction of the vehicle with the motor shaft 420 as a reference, and include lower ends opened to the outside and upper ends fluidly connected to the pair of pump-side operational fluid passages 312a, 312b.

The pair of motor-side perforated bores 315 includes the lower ends closed by the caps 318, and intermediate areas between the lower ends and the upper ends opened to the motor surface 300M through the pair of motor-side kidney ports 310M.

The port block 300 is further formed with a charge fluid passage 320, as shown in FIG. 3.

The charge fluid passage 320 has a first end opened to the outer surface to form a charge port 320(P) and second ends fluidly connected to the pair of operational fluid passages 310a, 310b through a pair of check valves 330, respectively, as shown in FIGS. 4 and 9.

Specifically, the charge fluid passage 320 includes a branched charge fluid passage 322 having a first end fluidly connected to one (for example, the first operational fluid passage 310a) of the pair of operational fluid passages 310 through the check valve 330 and a second end fluidly connected to the other (for example, the second operational fluid passage 310a) of the pair of operational fluid passages 310 through the check valve 330, and a common charge fluid passage 321 having a first end opened to the outer surface to form the charge port 320(P) and a second end fluidly connected to the branched charge fluid passage 322 between the pair of check valves 330, as shown in FIGS. 3 and 9.

In the present embodiment, the charge port 320(P) is positioned on a surface of the port block 300 contacting with the auxiliary pump case 520, and receives the hydraulic fluid from the auxiliary pump main body 510 through the fluid passages formed in the auxiliary pump case 520.

Specifically, in the wheel motor device 100A according to the present embodiment, a returned fluid, which is supplied from the auxiliary pump main body 510 to the hydraulic device 15 as the operational fluid and which is then returned from the hydraulic device 15, is introduced into the charge port 320(P), as shown in FIG. 3.

In detail, the auxiliary pump case 520 is formed with a suction fluid passage 530 including a first end opened to the outer surface to form a suction port 530(P) and a second end fluidly connected to a suction side of the auxiliary pump main body 510, a discharge fluid passage 531 having a first end fluidly connected to a discharge side of the auxiliary pump main body 510 and a second end opened to the outer surface to form a discharge port 531(P), and a returned fluid passage 532 having a first end opened to the outer surface to form a returned fluid port 532(P) and a second end opened to a surface contacting with the port bock 300 so as to fluidly connect to the charge port 320(P), as shown in FIGS. 3, 4 and 10.

As shown in FIG. 3, the suction port 530(P) is connected to a suction conduit 540. Specifically, the suction conduit 540 has a first end fluidly connected to a fluid source (for example, an external reservoir 900) through a filter 541 and a second end fluidly connected to the suction port 530(P).

The discharge port 531(P) is fluidly connected to an operational fluid supply conduit 545. Specifically, the operational fluid supply conduit 545 has a first end fluidly connected to the discharge port 531(P) and a second end fluidly connected to the hydraulic device 15.

The returned fluid port 532(P) is fluidly connected to a returned operational fluid conduit 545. Specifically, the returned operational fluid conduit 545 has a first end fluidly connected to the hydraulic device 15 and a second end fluidly connected to the returned fluid port 532(P).

With the arrangement, the returned fluid, which is supplied from the auxiliary pump main body 510 to the hydraulic device 15 and then is returned from the hydraulic device 15, is supplied to the charge fluid passage 320 through the returned fluid passage 532.

The wheel motor device 100A is further provided with a hydraulic device relief valve 555 for setting an operational pressure of the hydraulic device 15, and a charge relief valve 560 for setting a charge pressure of the charge fluid supplied to the pair of operational fluid passages 310a, 310b, as shown in FIGS. 3 and 10.

In the present embodiment, the hydraulic device relief valve 555 is mounted to the auxiliary pump case 520 so as to have a primary side fluidly connected to the discharge fluid passage 531 and a secondary side fluidly connected to the returned fluid passage 532, as shown in FIG. 10.

The arrangement makes it possible to efficiently utilize a surplus fluid of the discharge fluid passage 531 as the charge fluid.

The charge relief valve 560 is mounted to the auxiliary pump case 520 so as to have a primary side fluidly connected to the returned fluid passage 532 and a secondary side fluidly connected to the suction fluid passage 530, as shown in FIG. 10.

The arrangement makes it possible to return a surplus fluid of the returned fluid passage 532 to the suction fluid passage 530, thereby reducing a load of the auxiliary pump main body 510.

In the present embodiment, the port block 300 is further formed with a communicating fluid passage 340 that fluidly connect between the pump space 400P and the motor space 400M, as shown in FIGS. 3 and 4.

The arrangement of the communicating fluid passage 340 makes it possible to discharge both of fluid that is leaked from the hydraulic pump main body 410 and stored in the pump space 400P and fluid that is leaked from the hydraulic motor main body 210 and stored in the motor space 200M to the fluid sump, only by fluidly connecting either the pump space 300P or the motor space 300M to the fluid sump.

In the present embodiment, the wheel motor device 100A is configured so as to open the pump space 400P to the fluid sump.

Specifically, the pump case 450 is formed with a discharge fluid passage 350 having a first end fluidly connected to the pump space 400P and a second end opened outward, as shown in FIGS. 3 and 4. The second end of the discharge fluid passage 350 is fluidly connected to the external reservoir 900 functioning as the fluid sump through an external drain conduit 355 (see FIG. 3).

The wheel motor device 100A according to the present embodiment further includes, as show in FIG. 3, a bypass fluid passage 360 fluidly connecting between the first and second operational fluid passages 310a, 310b, and a bypass valve 370 selectively having the bypass fluid passage 360 in a fluidly-connecting state or a shutting-off state.

In the present embodiment, the bypass fluid passage 360 and the bypass valve 370 are provided in the port block 300.

The arrangement of the bypass fluid passage 360 and the bypass valve 370 makes it possible to prevent the pressure difference from occurring between the pair of operational fluid passages 310a, 310b when forcibly towing the working vehicle 1A at the time of malfunction or the like of the engine 20 or the HST.

In the present embodiment, the bypass valve 370 is a rotary valve configured so as to fluidly connect the bypass fluid passage 360 with the communicating fluid passage 340 when having the bypass fluid passage 360 in the fluidly-connecting state and fluidly disconnect between the bypass fluid passage 360 and the communicating fluid passage 340 when having the bypass fluid passage 360 in the shutting-off state, as shown in FIGS. 3 and 9.

Specifically, the bypass valve 370 includes, as shown in FIG. 9, a main body portion 371 inserted in a installation hole 380 formed in the port block 300 in a liquid-tight manner and in a rotatable manner around its axis line, a small diameter portion 372 extending from the main body portion 371 toward a proximal end side within the installation hole 380 and having a diameter smaller than that of the main body portion 371 such that a gap 373 is created between its outer circumferential surface and an inner circumferential surface of the installation hole 380, and an operating portion 375 extending from the small diameter portion 372 toward the proximal end side and projecting outward. The bypass valve 370 is capable of being operated around its axis line through the operating portion 375.

The communicating fluid passage 340 is configured so as to fluidly connect between the motor space 200M and the pump space 400M through the installation hole 380, as shown in FIGS. 4 and 9.

Specifically, the installation hole 380 includes, as shown in FIG. 9, a distal end portion 381 extending toward a distal end side than the main body portion 371, an intermediate portion 382 in which the main body portion 371 is positioned, and a proximal end portion 383 in which the small diameter portion 372 is positioned.

The communicating fluid passage 340 includes a motor-side communicating fluid passage 340M having a first end fluidly connected to the motor space 200M and a second end fluidly connected to one (the proximal end portion 383 in the present embodiment) of the distal end portion 381 and the proximal end portion 383 of the installation hole 380, and a pump-side communicating fluid passage 340P having a first end fluidly connected to the pump space 400P and a second end fluidly connected to the other (the distal end portion 381 in the present embodiment) of the distal end portion 381 and the proximal end portion 383 of the installation hole 380, as shown in FIGS. 4, 6 and 10.

The bypass fluid passage 360 is configured so as to fluidly connect between the pair of operational fluid passages 310a, 310b through the installation hole 380.

That is, the bypass fluid passage 360 includes, as shown in FIG. 9, a first bypass fluid passage 360a having a first end fluidly connected to the first operational fluid passage 310a and a second end opened to the intermediate portion 382 of the installation hole 380, and a second bypass fluid passage 360b having a first end fluidly connected to the second operational fluid passage 310b and a second end opened to the intermediate portion 382 of the installation hole 380.

The bypass valve 370 includes a connecting fluid passage 391 configured so as to fluidly connect between the first and second bypass fluid passages 360a, 360b when the bypass valve 370 is positioned at a fluidly-connecting position that is a first position around the axis line and fluidly disconnect between the first and second bypass fluid passages 360a, 360b when the bypass valve 370 is rotated from the fluidly-connecting position around its axis line, a first drain fluid passage 392 having a first end fluidly connected to the connecting fluid passage 391 and a second end opened to an outer surface of the small diameter portion 372, and a second drain fluid passage 393 having a first end fluidly connected to the connecting fluid passage 391 and a second end opened to a distal end surface of the main body portion 371, as shown in FIGS. 6 and 9.

The bypass valve 370 with the configuration operates as follows.

When the bypass valve 370 is positioned at the fluidly-connecting position through the operating potion 375, the first and second bypass fluid passages 360a, 360b are fluidly connected to each other through the connecting fluid passage 391. At this time, the motor-side communicating fluid passage 340M is fluidly connected to the connecting fluid passage 391 through the gap 373 between the small diameter portion 372 and the proximal end portion 383 of the installation hole 380, and the first drain fluid passage 392. At the same time, the pump-side communicating fluid passage 340P is fluidly connected to the connecting fluid passage 391 through the distal end portion 381 of the installation hole 380 and the second drain fluid passage 393.

Accordingly, the pressurized fluid in the first and second operational fluid passages 310a, 310b drains into the motor space 200M and the pump space 400M.

Providing the bypass valve 370 with the drain function as described above makes it possible to achieve an effect of quickly taking out an air from the first and second operational fluid passages 310a, 310b in addition to a bypass effect of preventing the pressure difference from occurring between the pair of operational fluid passages 310a, 310b when forcibly towing the working vehicle 1A.

On the other hand, when the bypass valve 370 is positioned at positions other than the fluidly-connecting position around the axis line, both of the second ends of the first and second bypass fluid passages 360a, 360b are closed by the main body portion 371 of the bypass valve 370.

Accordingly, the bypass fluid passage 360 is shut off and the communicating fluid passage 340 is fluidly disconnected to the bypass fluid passage 360, whereby the pressure difference between the first and second operational fluid passages 310a, 310 could be effectively maintained.

The installation hole 380 is preferably formed so as to extend from an end surface of the horizontal portion 302 positioned on the outer side in the width direction of the vehicle toward the inner side in the width direction of the vehicle such that the operating portion 375 of the bypass valve 370 projects outward in the width direction of the vehicle, as shown in FIGS. 4 and 9.

The arrangement makes it possible to enhance the operationality of the bypass valve 370.

In the present embodiment, the port block 300 is configured such that the vertical portion 301 and the horizontal portion 302 are integrally formed. Instead of the configuration, the port block 300 may include a motor-side port block forming the vertical portion 310 and a pump-side port block forming the horizontal portion 302, the motor-side and pump-side port blocks being detachably connected to each other.

The motor case 250 is preferably provided with a mounting portion for mounting the wheel motor device 100A to the vehicle frame 10, and the pump case 450 is configured to be free with respect to the vehicle frame 10 (have no connection with the vehicle frame 10).

The arrangement makes it possible to perform a maintenance work of the components of the hydraulic pump unit 400 such as the hydraulic pump main body 410 and the output adjusting member 430 without substantially disassembling the wheel motor device 100A.

In the present embodiment, the end wall 251 of the motor case 250 includes, as shown in FIG. 4, a flange portion 251 extending radially outward, and the wheel motor device 100A is mounted to the vehicle frame 10 utilizing the flange portion 251 as the mounting portion.

The mounting portion may be arranged at the gear case 650 instead of the arrangement of the mounting portion at the motor case 250.

Second embodiment

Another embodiment of the wheel motor device according to the present invention will now be described with reference to the accompanying drawings.

Figure 11:
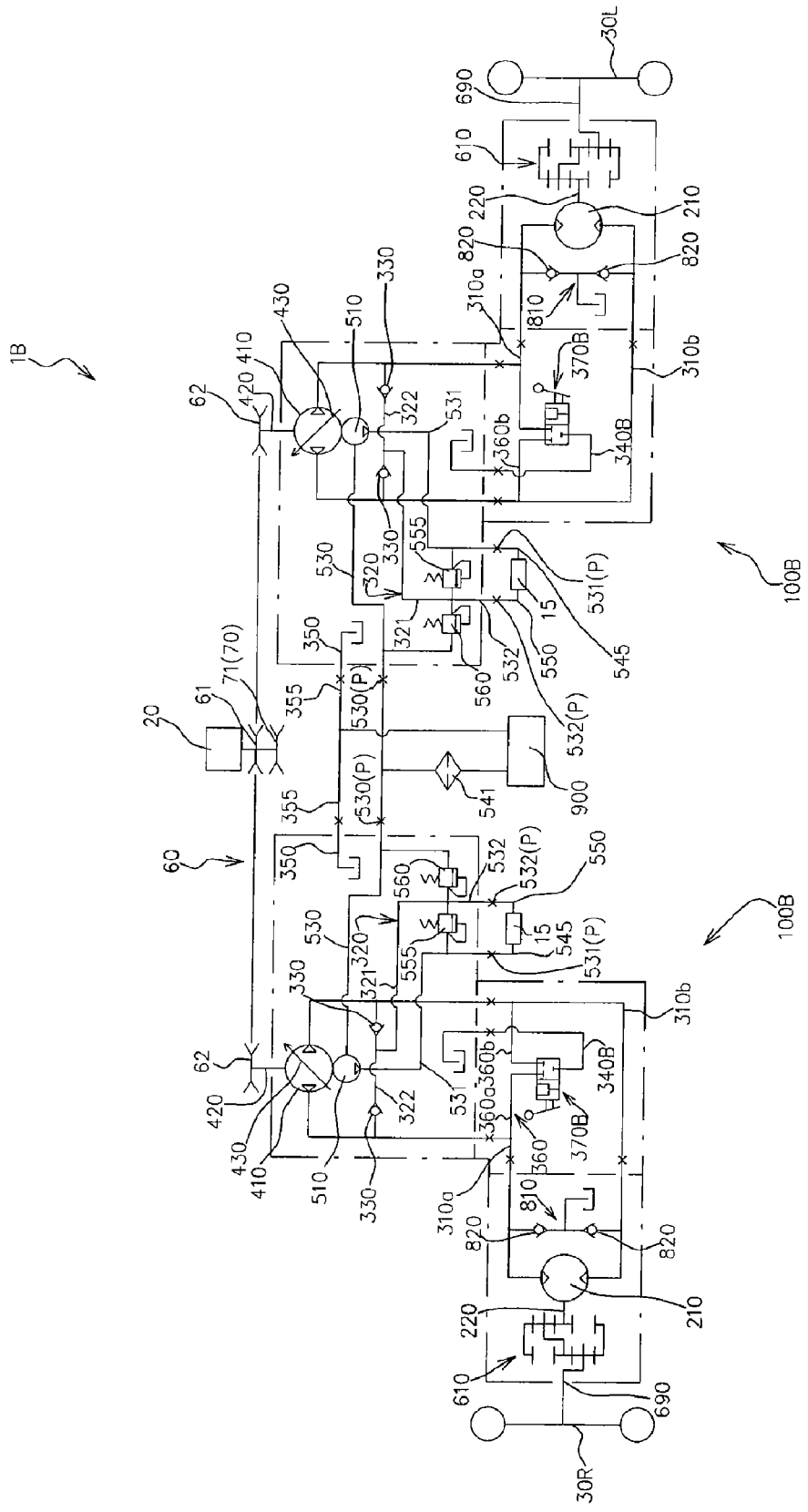
FIG. 11 is a hydraulic circuit diagram of a working vehicle to which a wheel motor device according to a second embodiment of the present invention is applied.

FIG. 11 shows a hydraulic circuit diagram of a working vehicle 1B to which a wheel motor device 100B according to the present embodiment is applied.

Figure 12:
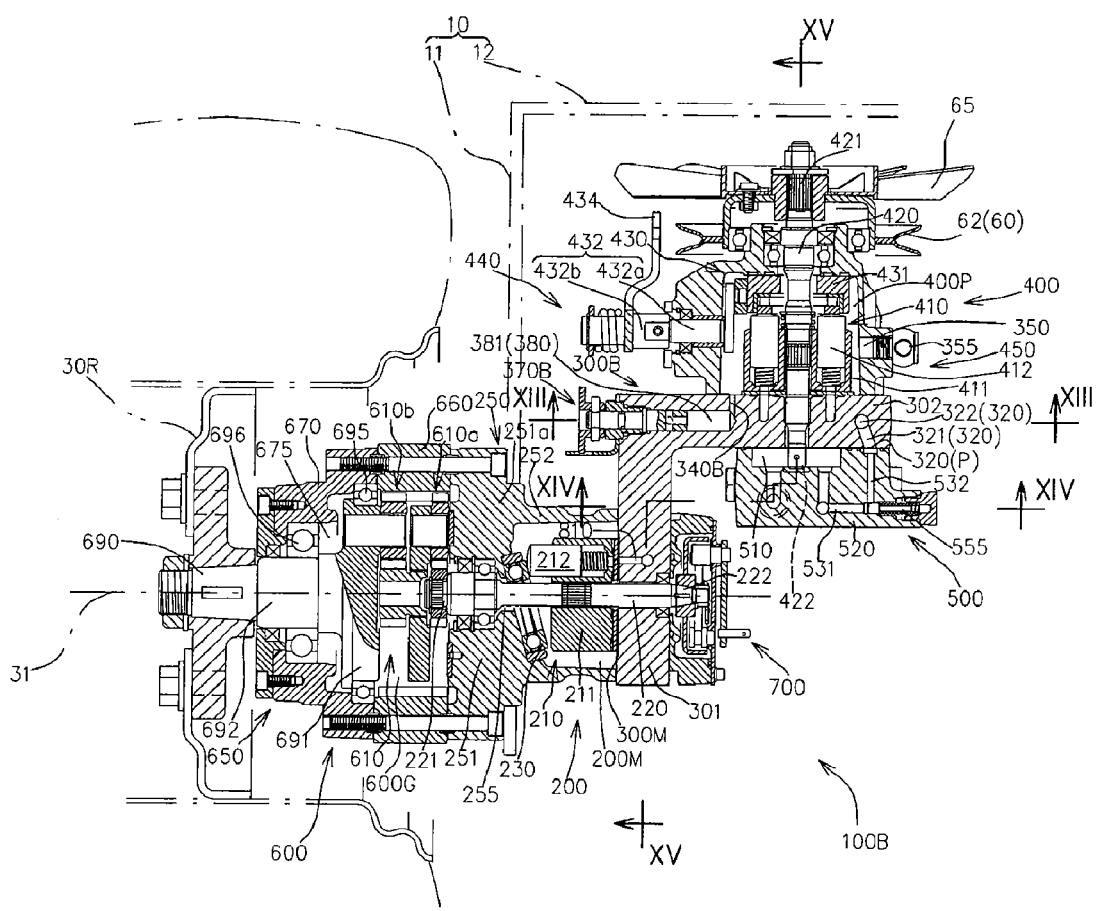
FIG. 12 is a vertical cross sectional front view of the wheel motor device according to the second embodiment.

FIG. 12 shows a vertical cross sectional front view of the wheel motor device 100B according to the present embodiment with applied to the right-side driving wheel 30R.

In the drawings, the same elements as those of the first embodiment have been given the same reference characters to omit a detailed description thereof.

The wheel motor device 100B according to the present embodiment is mainly different from the wheel motor device 100A according to the first embodiment in that the motor space 200M and the pump space 400P are independent from each other, and a self-suction structure for self-suctioning the operational fluid for the HST is provided.

Specifically, the wheel motor device 100B includes, as shown in FIG. 11, a port block 300B and a bypass valve 370B in place of the port block 300 and the bypass valve 370, in the wheel motor device 100A according to the first embodiment.

Figure 13:
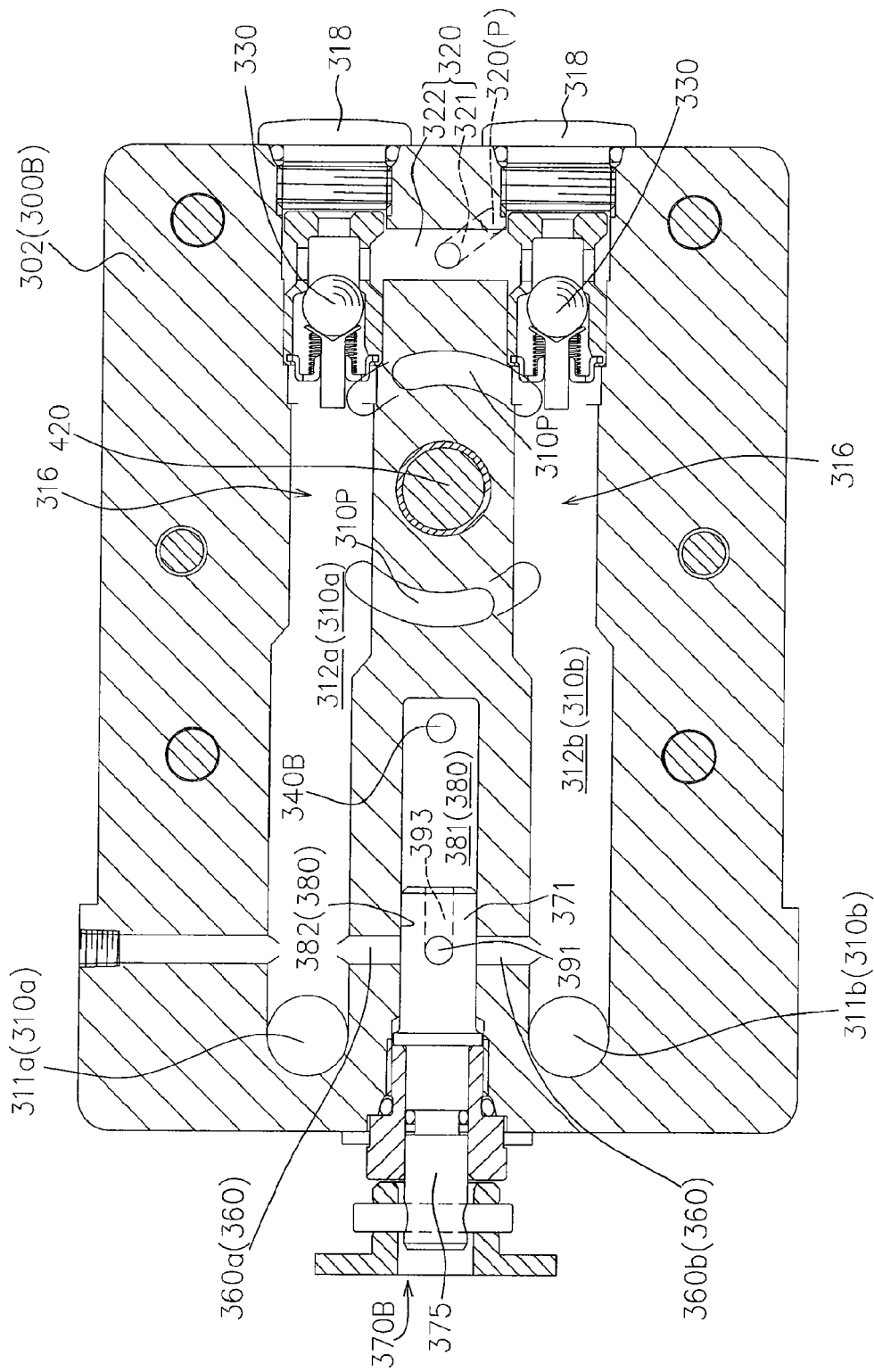
FIG. 13 is a cross sectional view taken along a line XIII-XIII in FIG. 12.
Figure 14:
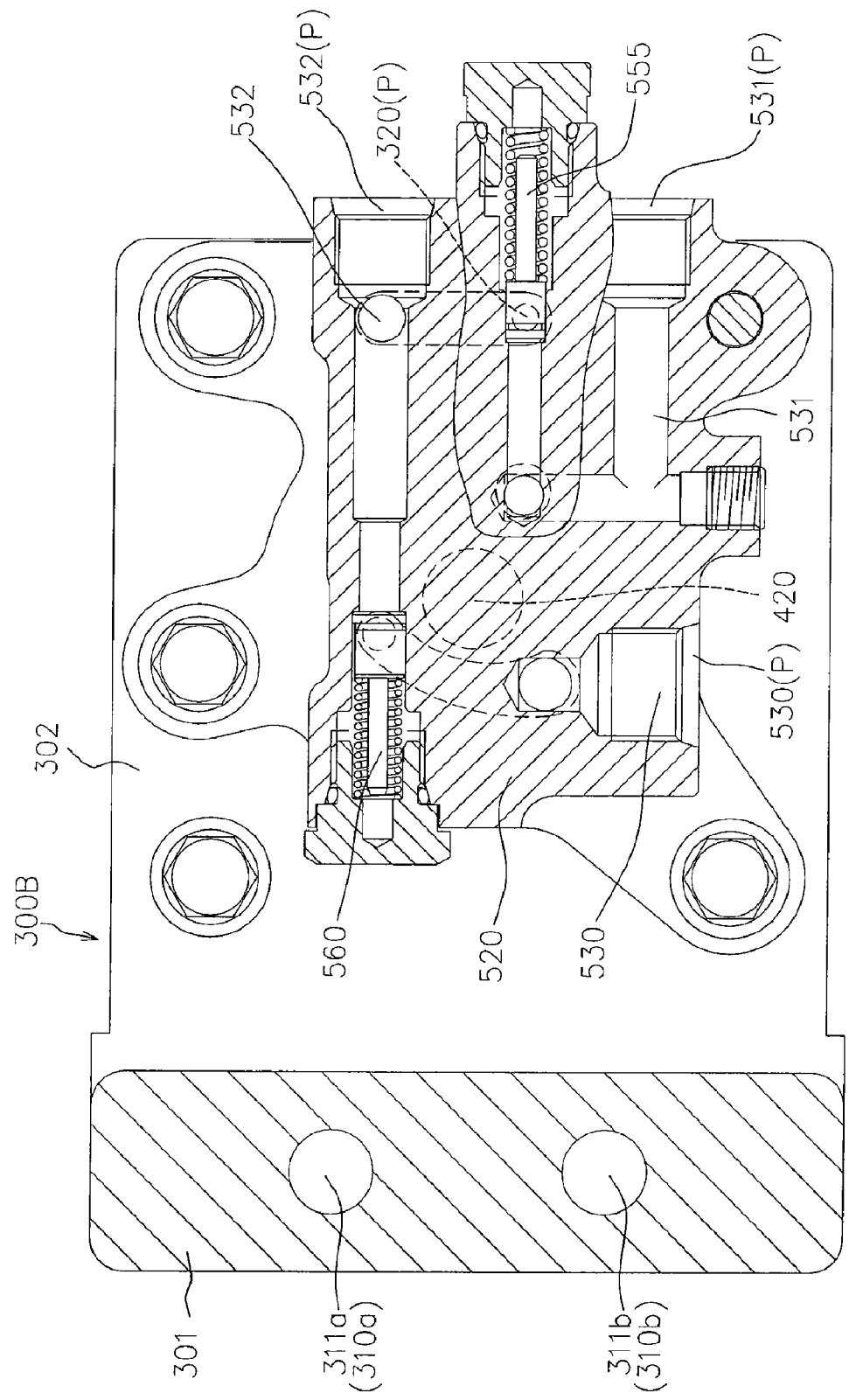
FIG. 14 is a cross sectional view taken along a line XIV-XIV in FIG. 12.

FIGS. 13 and 14 respectively show cross sectional views taken along a line XIII-XIII and a line XIV-XIV in FIG. 12.

The port block 300B is mainly different from the port block 300 in that a drain fluid passage 340B is formed in place of the communicating fluid passage 340.

The drain fluid passage 340B has a first end opened to any one (the pump space 400P in the shown embodiment) of the motor space 200M and the pump space 400P and a second end fluidly connected to the distal end portion 381 of the installation hole 380, as shown in FIGS. 12 and 13.

The bypass valve 370B is a rotary valve capable of being operated around its axis line, likewise to the bypass valve 370.

The bypass valve 370B is configured to omit the small diameter portion 372 in the bypass valve 370.

Specifically, the bypass valve 370B includes, as shown in FIG. 13, the main body portion 371 inserted in the intermediate portion 382 of the installation hole 380 in a liquid-tight manner and in a rotatable manner around its axis line, and the operating portion 375 extending from the main body portion 371 toward the proximal end side and projecting outward.

The bypass valve 370B is formed with the connecting fluid passage 391 and the second drain fluid passage 393.

The bypass valve 370B with the configuration operates as follows.

When the bypass valve 370B is positioned at the fluidly-connecting position through the operating potion 375, the first and second bypass fluid passages 360a, 360b are fluidly connected to each other through the connecting fluid passage 391. At this time, the drain fluid passage 340B is fluidly connected to the connecting fluid passage 391 through the distal end portion 381 of the installation hole 380 and the second drain fluid passage 393.

Accordingly, the pressurized fluid in the first and second operational fluid passages 310a, 310b drains into the pump space 400P.

On the other hand, when the bypass valve 370B is positioned at positions other than the fluidly-connecting position around the axis line, both of the second ends of the first and second bypass fluid passages 360a, 360b are closed by the main body portion 371 of the bypass valve 370B.

Accordingly, the bypass fluid passage 360 is shut off and the drain fluid passage 340B is fluidly disconnected to the bypass fluid passage 360, whereby the pressure difference between the first and second operational fluid passages 310a, 310 could be effectively maintained.

The self-suction structure provided in the wheel motor device 110B according to the present embodiment will now be explained.

Figure 15:
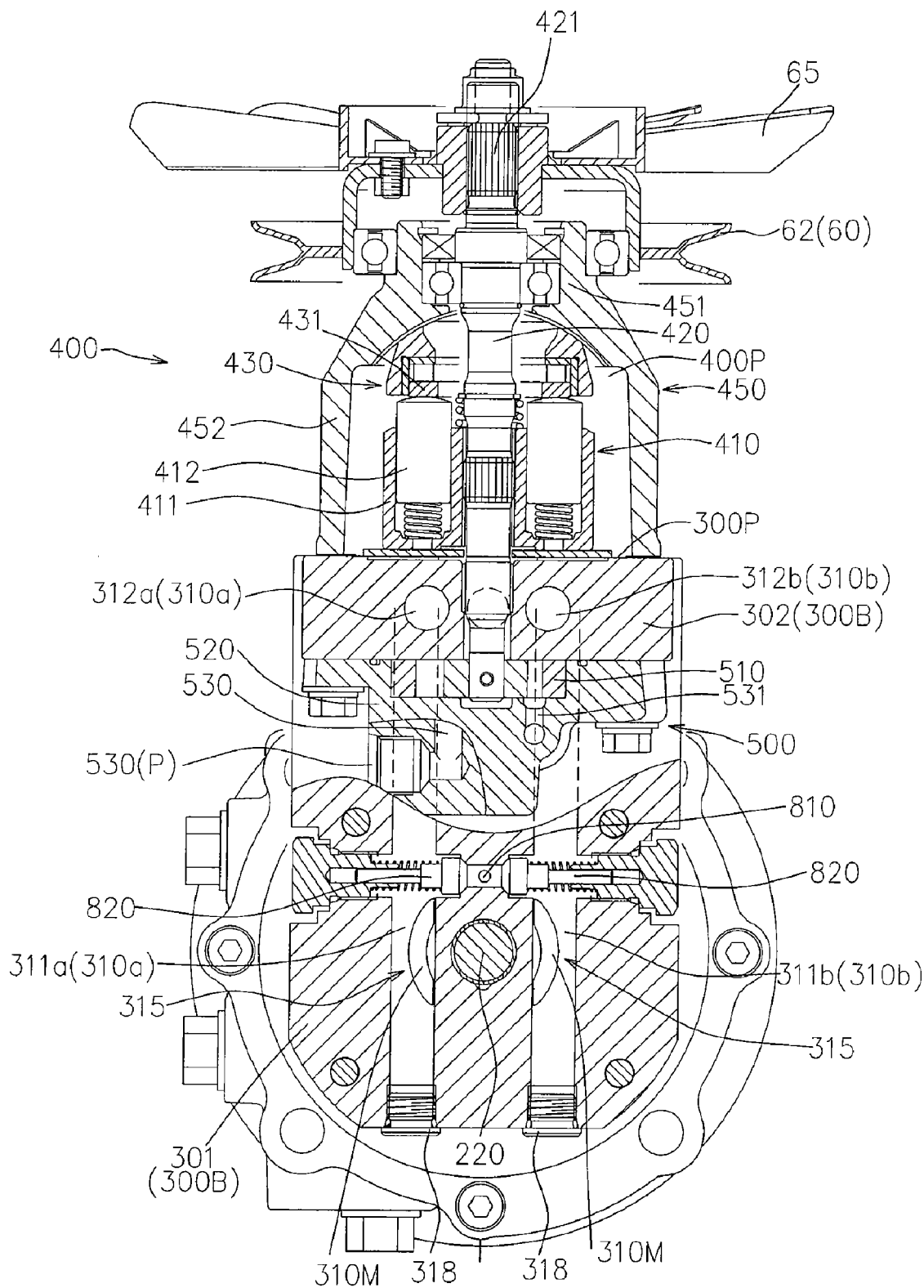
FIG. 15 is a cross sectional view taken along a line XV-XV in FIG. 12.

FIG. 15 shows a cross sectional view taken along a line XV-XV in FIG. 12.

As shown in FIGS. 11 and 15, the wheel motor device 100B includes a self-suction fluid passage 810 having a first end fluidly connected to the motor space 200M or the pump space 400P and a second end fluidly connected to at least one operational fluid passage of the pair of operational fluid passages 310a, 310b, and a self-suction check valve 820 interposed in the self-suction fluid passage 810 so as to allow the fluid to flow from the motor space 200M or the pump space 400P to at least the one operational fluid passage while preventing the reverse flow.

In the present embodiment, the second end of the self-suction fluid passage 810 is branched so as to fluidly connect to both the pair of operational fluid passages 310a, 310b, and the check valves 820 are respectively interposed between the branched second ends of the self-suction fluid passage 810 and the pair of operational fluid passages 310a, 310b.

With the self-suction structure including the self-suction fluid passage 810 and the self-suction check valve 820, it is possible to effectively prevent a free wheel phenomenon.

That is, for example, when the working vehicle is parked on the hill in a state where the engine source 20 is stopped and the HST is in the neutral state, a rotational force applies on the motor shaft operatively connected to the driving-wheel, and then the motor main body supported by the motor shaft attempts to perform a pump action.

In this case, if the pair of operational fluid passages, which fluidly connect between the hydraulic pump main body and the hydraulic motor main body, are filled with the operational fluid, a brake force applies on the hydraulic motor main body via the operational fluid. However, at the same time, one of the operational fluid passages becomes high-pressure due to the pump action of the hydraulic motor main body, and the operational fluid might leak out from the high-pressure-side operational fluid passage.

If such a leak of the operational fluid occurs, a circulation of the operational fluid from a low-pressure-side operational fluid passage to the high-pressure-side operational fluid passage occurs, resulting in promoting the operational fluid leak from the high-pressure-side operational fluid passage, and eventually leaking out all the operational fluid from the pair of operational fluid passages so that the driving wheel might start to freely rotate (the free wheel phenomenon.

On the other hand, the arrangement of the self-suction fluid passage 810 and the self-suction check valve 820 makes it possible to automatically replenish the operational fluid to an operational fluid passage of the pair of operational fluid passages 310a, 310b that has a negative pressure, thereby effectively preventing the free wheel phenomenon.

The self-suction structure is preferably configured so as to suction the fluid from a space (the motor space 200M in the present embodiment), to which the drain fluid passage 340B is not fluidly connected, out of the motor space 200M and the pump space 400P, thereby omitting a necessity of providing the hydraulic motor unit 200 with an external drain conduit.

That is, the HST operational fluid leaks out from the hydraulic motor main body 210 and the hydraulic pump main body 410. The leakage fluid is stored in the motor space 200M and the pump space 400P that are capable of storing fluid. Accordingly, unless a drain structure for draining the leakage fluid, which is stored in the motor space 200M and the pump space 400P, from the motor space 200M and the pump space 400P, the motor space 200M and the pump space 400P are filled with the leakage fluid and the leakage fluid finally spills over from the motor space 200M and the pump space 400P.

Furthermore, the drain fluid passage 340B is fluidly connected to the pump space 400P in the present embodiment, as described above.

That is, in addition to the leakage fluid from the hydraulic pump main body 410, the operational fluid flows from the pair of operational fluid passages 310a, 310b into the pump space 400P at the time when the bypass fluid passage 360 is in the fluidly-connecting state.

In view of this point, the pump space 400P to which the drain fluid passage 340B is fluidly connected is fluidly connected to the external reservoir 900 through the discharge fluid passage 350 and the external drain conduit 355, as shown in FIGS. 11 and 12.

In the present embodiment, the motor space 200M is, on the other hand, independent from the pump space 400P, and stores only the leakage fluid from the hydraulic motor main body 210.

Accordingly, the arrangement of only the self-suction structure without the external drain structure makes it possible to effectively prevent the stored fluid from spilling over from the motor space 200M.

Specifically, the fluid pressure in the motor space 200M increases as the amount of the stored leakage fluid increase. When the fluid pressure in the motor space 200M exceeds a pressure defined by a resultant force of a hydraulic pressure of a low-pressure-side operational fluid passage out of the pair of operational fluid passages 310a, 310b and a biasing force of the corresponding self-suction check valve 820, the stored fluid in the motor space 200M automatically flows into the low-pressure-side operational fluid passage through the self-suction fluid passage 810.

Therefore, it is possible to prevent the stored fluid in the motor space 200M from spilling over from the motor space 200M without providing the hydraulic motor unit 200 with the external drain structure, thereby improving design freedom regarding a piping structure as well as assembling workability.

Third embodiment

Still another embodiment of the wheel motor device according to the present invention will now be described with reference to the accompanying drawings.

Figure 16:
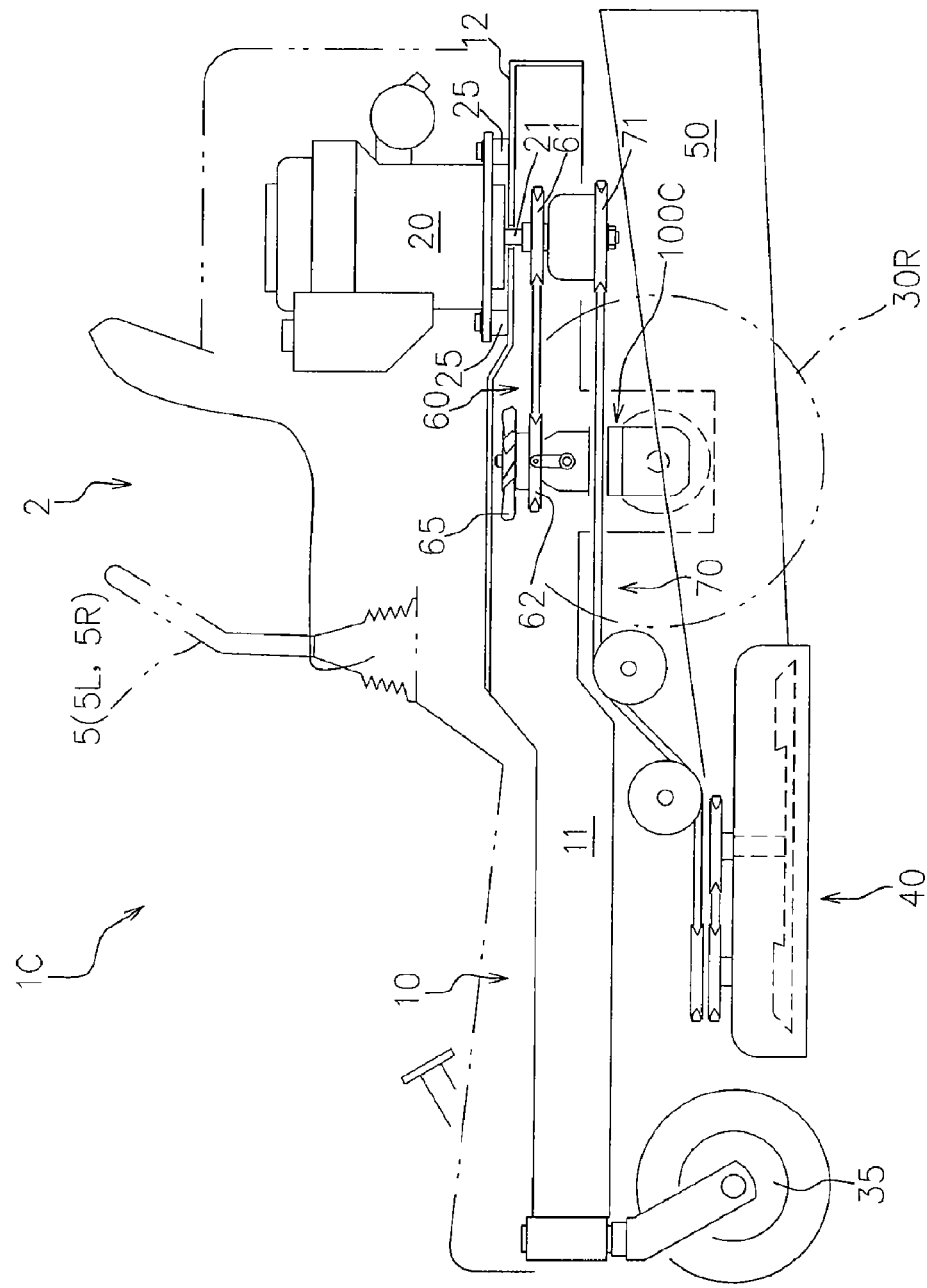
FIG. 16 is a side view of a working vehicle to which a wheel motor device according to a third embodiment of the present invention is applied.
Figure 17:
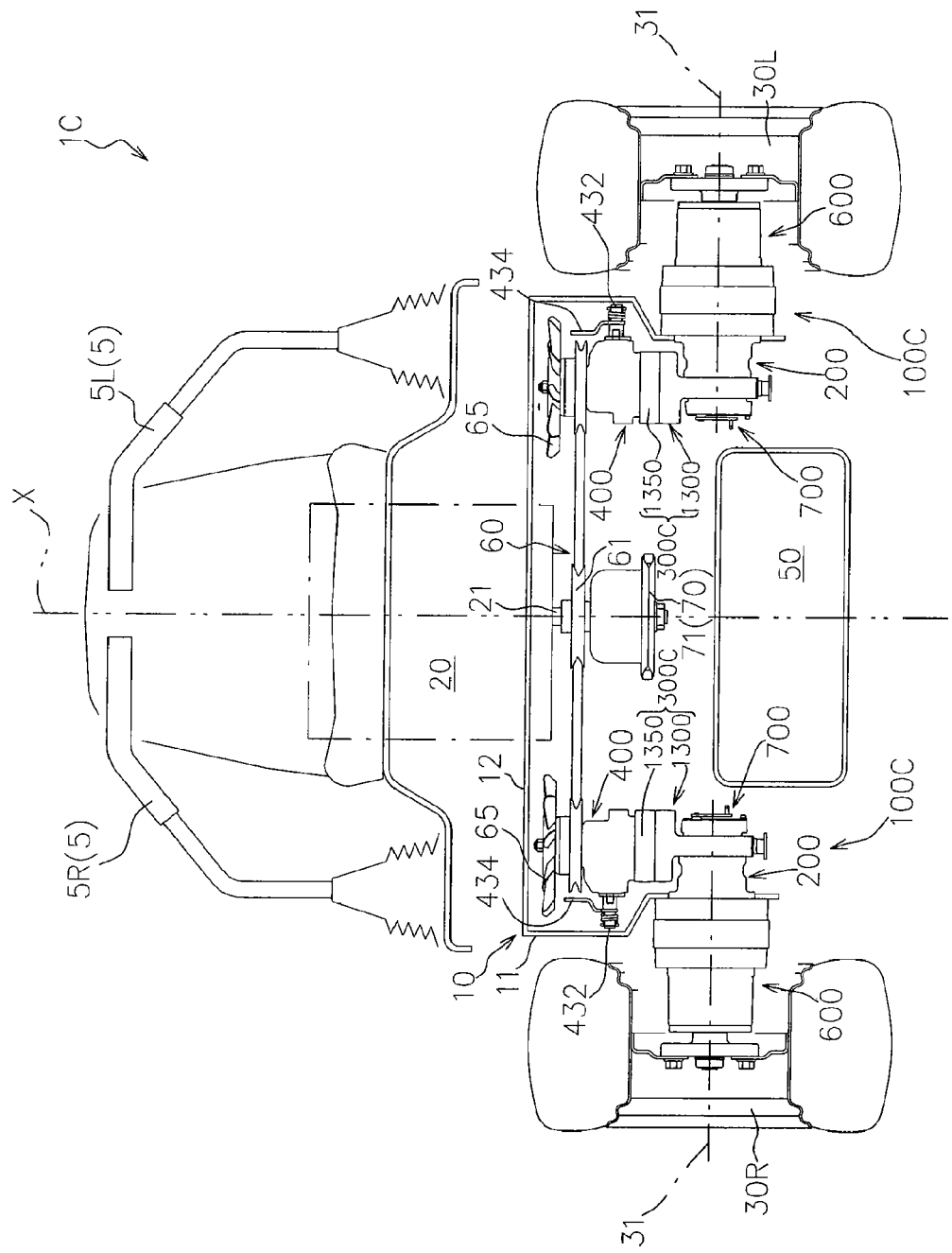
FIG. 17 is a front view of the working vehicle shown in FIG. 16.

FIGS. 16 and 17 respectively show a side view and a front view of a working vehicle 1C to which a wheel motor device 100C according to the present embodiment is applied.

Figure 18:
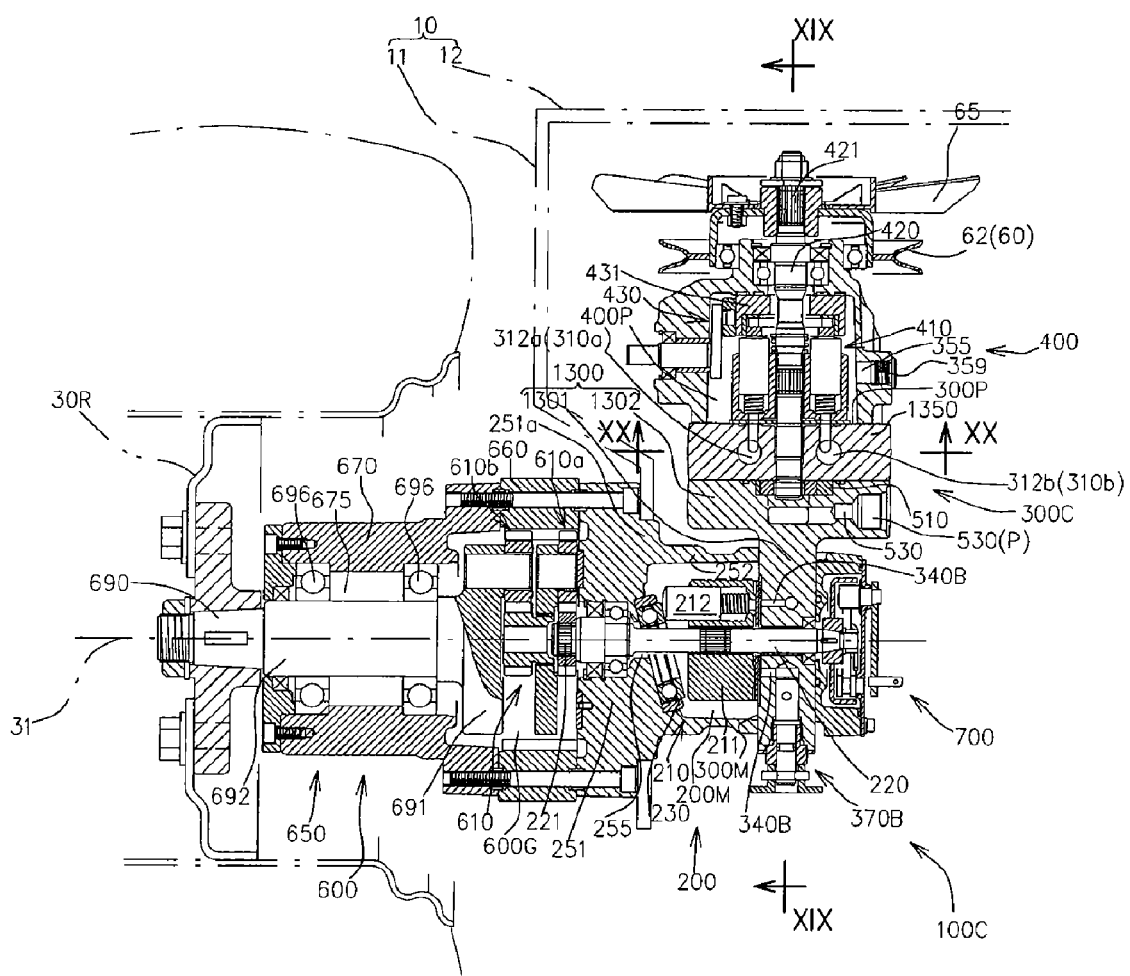
FIG. 18 is a vertical cross sectional front view of the wheel motor device according to the third embodiment.

FIG. 18 shows a vertical cross sectional front view of the wheel motor device 100C according to the present embodiment with applied to the right-side driving wheel 30R.

In the drawings, the same elements as those of the first and second embodiments have been given the same reference characters to omit a detailed description thereof.

In the wheel motor devices 100A, 100B according to the first and second embodiments, the horizontal portion 302 of the port block 300, 300B supporting the hydraulic pump main body 420 and the pump case 450 extends inward in the width direction of the vehicle from the upper end of the vertical portion 301 (see FIGS. 4 and 12).

That is, in the first and second embodiments, the hydraulic pump main body 420 and the pump case 450 are displaced inward in the width direction of the vehicle from the vertical portion 301 in a plan view.

On the other hand, the wheel motor device 110C according to the present embodiment is configured such that the hydraulic pump main body 410 and the pump case 450 overlaps with the vertical portion 301 in a plan view (as viewed from above), thereby shortening a length of the whole wheel motor device 100C, which includes the hydraulic pump main body 420 and the pump case 450, in the width direction of the vehicle.

Specifically, the wheel motor device 100C includes, as shown in FIG. 18, a port block 300C in place of the port block 300, in the wheel motor device 100B according to the second embodiment.

The port block 300C includes a motor-side port block 1300 extending substantially vertically so as to be orthogonal to the rotational axis 31 of the corresponding driving wheel 30R and having a vertical surface facing outward in the width direction of the vehicle, and a pump-side port block 1350 that has a horizontal surface facing upward and that is detachably connected to the motor-side port block 1300 so as to be positioned above the motor shaft 220, as shown in FIG. 18.

In the present embodiment, the vertical surface of the motor-side port block 1300 forms the motor surface 300M, and the horizontal surface of the pump-side port block 1350 forms the pump surface 300P.

Specifically, the motor-side port block 1300 integrally includes a vertical portion 1301 having the vertical surface and a horizontal portion 1302 extending inward and outward in the width direction of the vehicle from the upper end of the vertical portion 1301.

The pump-side port block 1350 is detachably connected to an upper surface of the horizontal portion 1302 such that the horizontal surface faces upward.

Figure 19:
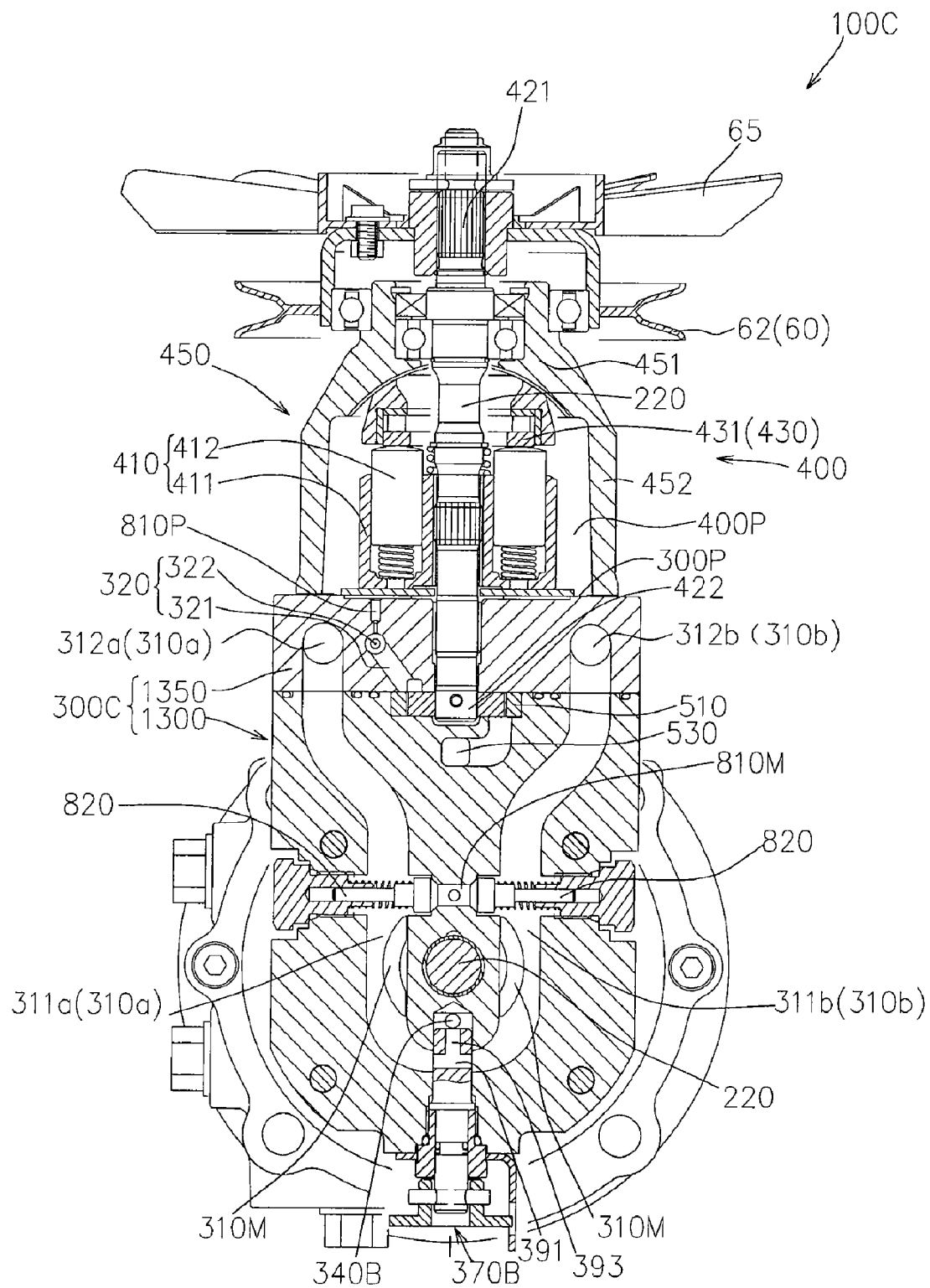
FIG. 19 is a cross sectional view taken along a line XIX-XIX in FIG. 18.
Figure 20:
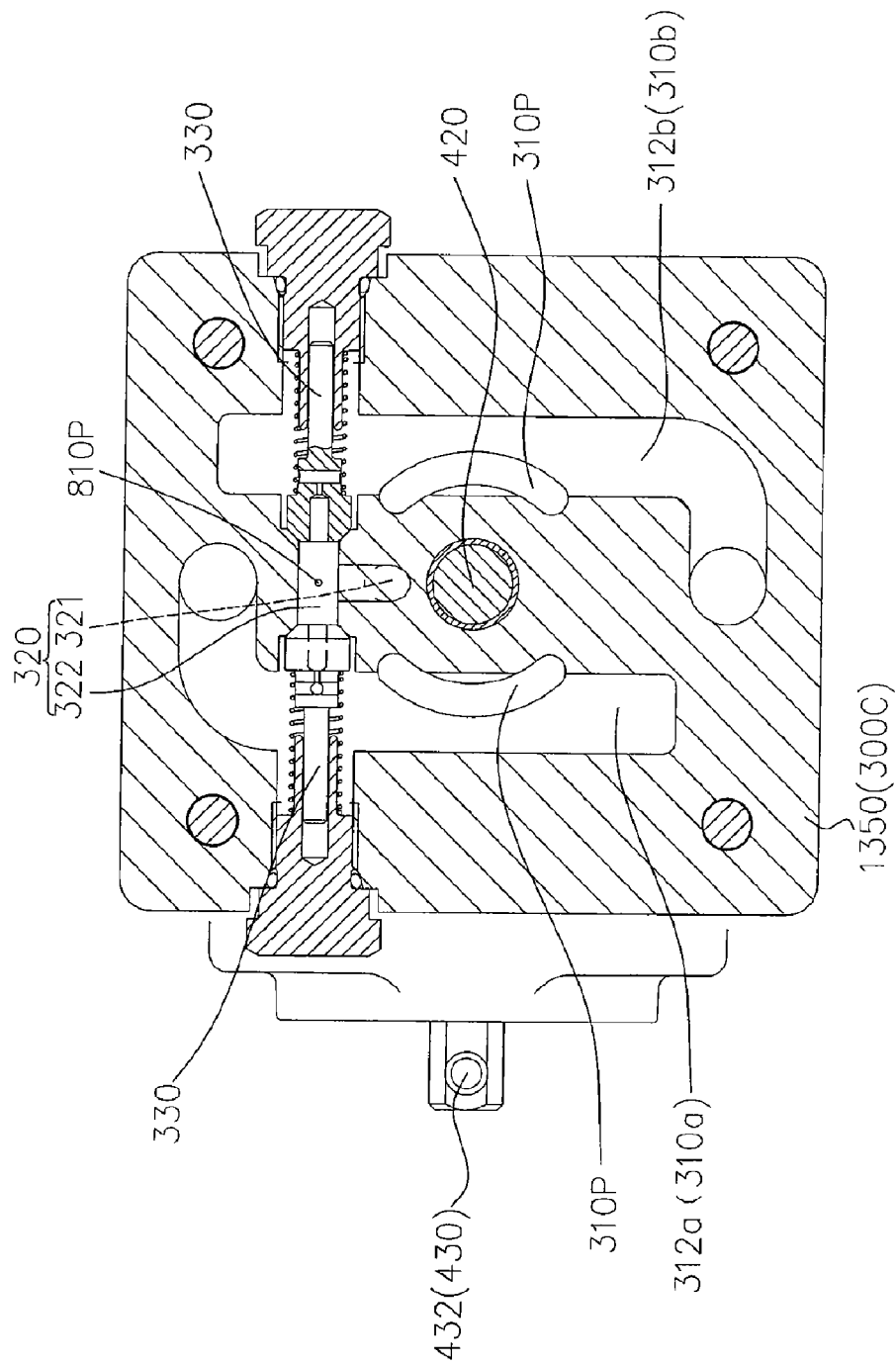
FIG. 20 is a cross sectional view taken along a line XX-XX in FIG. 18.

FIGS. 19 and 20 respectively show cross sectional views taken along a line XIX-XIX and a line XX-XX in FIG. 18.

As shown in FIG. 19, the motor-side port block 1300 is formed with the pair of motor-side operational fluid passages 311a, 311b opened to the motor surface 300M through the pair of motor-side portings such as the pair of motor-side kidney ports 310M.

As shown in FIG. 20, the pump-side port block 1350 is formed with the pump-side operational fluid passages 312a, 312b opened to the pump surface 300P through the pair of pump-side portings such as the pair of pump-side kidney ports 310P in a state of being fluidly connected to the motor-side operational fluid passages 311a, 311b.

In the present embodiment, the auxiliary pump main body 510 is accommodated in a joint portion at which the pump-side port block 1350 and the motor-side port block 1300 are connected to each other, and the auxiliary pump case 520 is omitted, as shown in FIG. 18.

Specifically, at least one (an upper surface of the horizontal portion 1302 in the illustrated embodiment) of a lower surface of the pump-side port block 1350 and the upper surface of the horizontal portion 1302 of the motor-side port block 1300 is formed with a concave portion, and the auxiliary pump main body 510 is accommodated in the concave portion.

In the present embodiment, the auxiliary pump main body 510 is utilized as only a charge pump main body for replenishing the operational fluid into the HST.

Specifically, the motor-side port block 1300 is formed with the suction fluid passage 530 having a first end opened to an outer surface to form the suction port 530(P) and a second end fluidly connected to the suction side of the auxiliary pump main body 510, as shown in FIG. 18.

The pump-side port block 1350 is formed with the charge fluid passage 320 for flowing the pressurized fluid discharged from the auxiliary pump main body 510 into the pair of operational fluid passages 310a, 310b, as shown in FIGS. 19 and 20.

Specifically, the charge fluid passage 320 includes the branched charge fluid passage 322 having a first end fluidly connected to one of the pair of operational fluid passages 310a, 310b through the check valve 330 and a second end fluidly connected to the other of the pair of operational fluid passages 310a, 310b through the check valve 330, and the common charge fluid passage 321 having a first end fluidly connected to the suction side of the auxiliary pump main body 510 and a second end fluidly connected to the branched charge fluid passage 322 between the pair of check valves 330.

In the wheel motor device 100C according to the present embodiment, each of the hydraulic pump unit 400 and the hydraulic motor unit 200 is provided with the self-suction structure.

A pump-side self-suction structure provided in the hydraulic pump unit 400 is configured so as to flow the stored fluid in the pump space 400P into the pair of operational fluid passages 310a, 310b using the charge fluid passage 320.

Specifically, the pump-side self-suction structure includes a pump-side self-suction fluid passage 810P having a first end opened into the pump space 400P and a second end fluidly connected to the common charge fluid passage 322 between the pair of check valves 330, as shown in FIGS. 19 and 20.

A motor-side self-suction structure provided in the hydraulic motor unit 200 includes, as shown in FIGS. 18 and 19, a motor-side self-suction fluid passage 810M having a first end opened into the motor space 200M and a second end fluidly connected to at least one of the pair of operational fluid passages 310a, 310b, and a self-suction check valve 820 interposed in the motor-side self-suction fluid passage 810M so as to allow the fluid to flow from the motor space 200M to at least the one operational fluid passage 310a, 310b while preventing the reverse flow.

In the present embodiment, as shown in FIG. 19, the second end of the motor-side self-suction fluid passage 810M is branched so as to fluidly connect to both the pair of operational fluid passages 310a, 310b, and the check valves 820 are respectively interposed between the branched second ends of the motor-side self-suction fluid passage 810M and the pair of operational fluid passages 310a, 310b.

The arrangement of the self-suction structures in both the hydraulic pump unit 400 and the hydraulic motor unit 200 makes it possible to get rid of the external drain structure in both the hydraulic pump unit 400 and the hydraulic motor unit 200 while more effectively preventing the free wheel phenomenon.

In view of this point, in the present embodiment, the discharge fluid passage 350 formed in the pump case 450 is closed by the plug 359 (see FIG. 18).

In a case where both the hydraulic pump unit 400 and the hydraulic motor unit 200 do not have the drain structure as in the present embodiment, there is a risk that a temperature of the HST operational fluid increases.

Regarding this point, the wheel motor device 100C according to the present embodiment includes the cooling fan 65 (see FIG. 18) rotatably driven by the pump shaft 420 likewise to each of the above embodiments, and effectively prevents the temperature of the HST operational fluid from increasing by the cooling fan 65.

The wheel motor device 100C is also provided with the bypass structure with drain function as in each of the above embodiments.

Specifically, the wheel motor device 100C includes the bypass fluid passage 360 for fluidly connecting between the pair of operational fluid passages 310a, 310b, the drain fluid passage 340B fluidly connected to at least one of the motor space 200M and the pump space 400P, and the bypass valve 370B capable of being rotatably operated around its axis line.

In the present embodiment, the bypass fluid passage 360 is formed in the vertical portion 1301 of the motor-side port block 1300 so as to fluidly connect between the pair of motor-side operational fluid passages 311a, 311b, as shown in FIG. 19.

The drain fluid passage 340B is formed in the motor-side port block 1300 such that its first end is opened into the motor space 200M.

The bypass valve 370B is configured so as to have the bypass fluid passage 360 in the fluidly-connecting state and have the drain fluid passage 340B fluidly connected to the bypass fluid passage 360 when being positioned at the fluidly-connecting position around its axis line, and is also configured so as to have the bypass fluid passage 360 in a shutting-off state and have the drain fluid passage 340B fluidly disconnected to the bypass fluid passage 360 when being positioned other than the fluidly-connecting position around its axis line.

In the present embodiment, the bypass valve 340B is mounted to the lower surface of the vertical portion 1301 of the motor-side port block 1300 such that the operating portion projects downward.

In the present embodiment, the output member 690 is supported at two points by the pair of bearing members 696 that are positioned between the inner circumferential surface of the through hole 675 and the outer circumferential surface of the output shaft portion 692 and that are disposed away to each other along the axis line direction.

Fourth embodiment

Still another embodiment of the wheel motor device according to the present invention will now be described with reference to the accompanying drawings.

Figure 21:
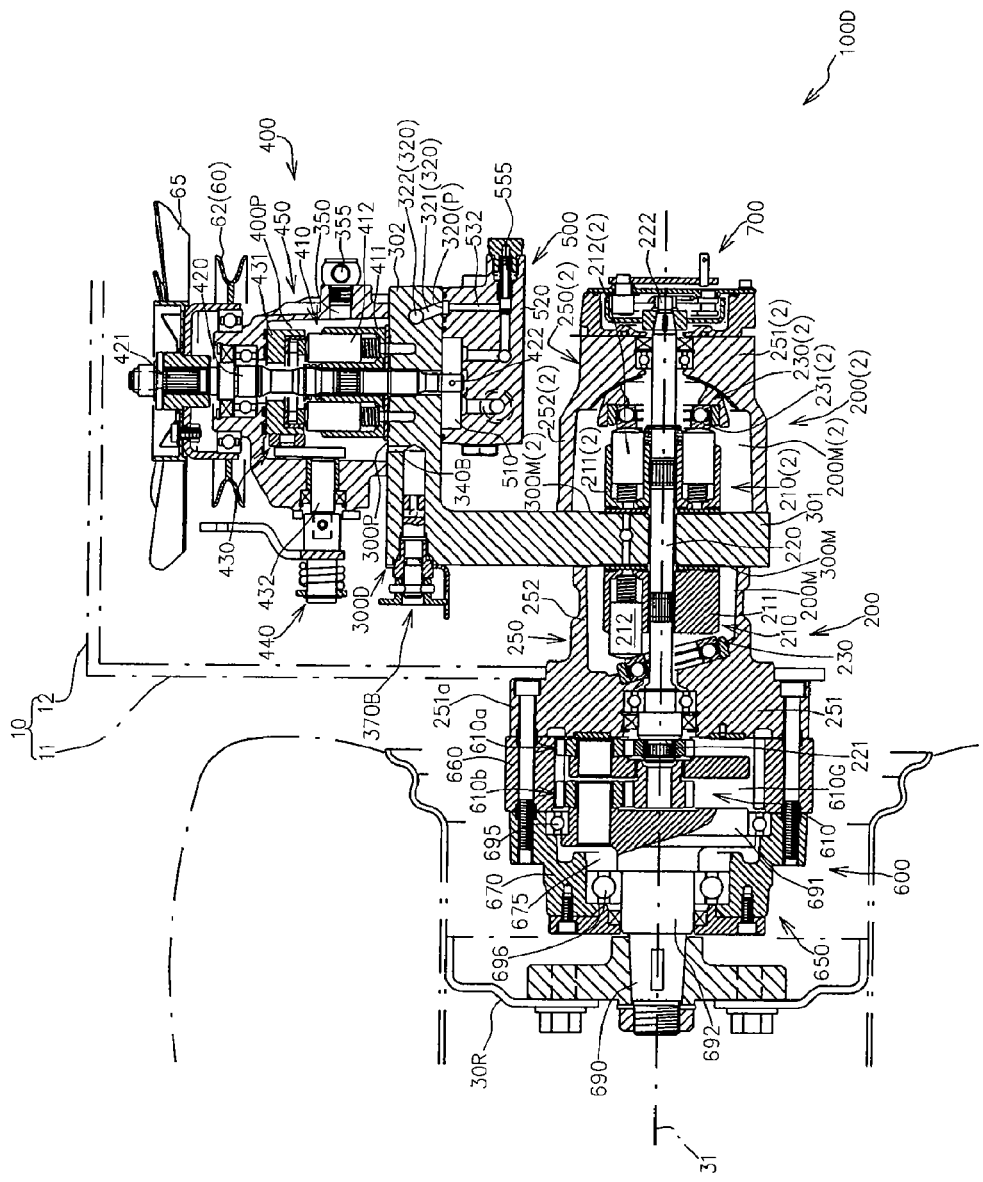
FIG. 21 is a vertical cross sectional front view of a wheel motor device according to a fourth embodiment of the present invention.

FIG. 21 shows a vertical cross sectional front view of a wheel motor device 100D according to the present embodiment with applied to the right-side driving wheel 30R.

In the drawings, the same elements as those of the first to third embodiments have been given the same reference characters to omit a detailed description thereof.

Each of the wheel motor devices 100A-100C according to the first to third embodiments is configured such that the hydraulic pump main body 410 forms the HST in cooperation with the single hydraulic motor main body 210.

On the other hand, the wheel motor device 100D according to the present embodiment is configured such that the hydraulic pump main body 410 forms the HST in cooperation with a second hydraulic motor main body 210(2) in addition to the hydraulic motor main body 210.

Specifically, the wheel motor device 100D according to the present embodiment includes, as shown in FIG. 21, a port block 300D in place of the port block 300B, and further includes a second hydraulic motor unit 200(2), in the wheel motor device 100B according to the second embodiment.

The second hydraulic motor unit 200(2) includes the second hydraulic motor main body 210(2), and a second motor case 250(2) detachably connected to the port block 300D so as to form a second motor space 200M(2) for accommodating the second hydraulic motor main body 210(2).

The second hydraulic motor main body 210(2) forms the HST in cooperation with the hydraulic pump main body 410 and the hydraulic motor main body 210.

That is, the second hydraulic motor main body 210(2) is supported in a relatively non-rotatable manner by the motor shaft 220 that supports the hydraulic motor main body 210 in a relatively non-rotatable manner while being fluidly connected to the hydraulic pump main body 410.

The port block 300D includes the vertical portion 301 and the horizontal portion 302 likewise to the port block 300.

The motor shaft 220 extends in the width direction of the vehicle in a state of passing through the vertical portion 301 of the port block 300D. The motor shaft 220 supports the hydraulic motor main body 210 in a relatively non-rotatable manner at a portion positioned outward in the width direction of the vehicle than the vertical portion 301, and supports the second hydraulic motor main body 210(2) in a relatively non-rotatable manner at a portion positioned inward in the width direction of the vehicle than the vertical portion 301.

The second hydraulic motor main body 210(2) is supported by the motor shaft 220 in a relatively non-rotatable manner while being contacted in a sliding manner around its axis line with an inner surface of the vertical portion 301 facing inward in the width direction of the vehicle.

That is, in the present embodiment, the vertical portion 301 is configured such that the outer surface facing outward in the width direction of the vehicle forms the motor surface 300M and the inner surface facing inward in the width direction of the vehicle forms a second motor surface 300M(2) with which the second hydraulic motor main body 210(2) is contacted in a sliding manner around its axis line.

The second hydraulic motor main body 210(2) includes a second motor-side cylinder block 211(2) supported by the motor shaft 220 in a relatively non-rotatable manner, and a plurality of second motor-side pistons 212(2) accommodated in the second motor-side cylinder block 211(2) in a relatively non-rotatable manner around the axis line and in a reciprocating manner along the axis line.

The second motor case 250(2) is detachably connected to the second motor surface 300M(2) so as to surround the second hydraulic motor main body 210(2) that is supported by the motor shaft 220 in a relatively non-rotatable manner while being contacted with the second motor surface 300M(2) in a sliding manner around its axis line.

The second motor case 250(2) includes, as shown in FIG. 21, an end wall 251(2) positioned inward in the width direction of the vehicle than the second motor surface 300M(2) and facing the second motor surface 300M(2), and a peripheral wall 252(2) extending outward in the width direction of the vehicle from a peripheral edge of the end wall 251(2). The second motor case 250(2) is formed with an opening at an outer end in the width direction of the vehicle, the opening has a size for allowing the second hydraulic motor main body 210(2) to be passed therethrough.

The second motor case 250(2) is connected to the second motor surface 300M(2) of the port block 300D such that the opening is closed by the second motor surface 300M(2), whereby the end wall 251(2), the peripheral wall 252(2) and the second motor surface 300M(2) of the port block 300D forms the second motor space 200M(2).

In the present embodiment, the motor shaft 220 has the inner end 222 in the width direction of the vehicle projecting inward in the width direction of the vehicle from the end wall 251(2) of the second motor case 250(2). The brake unit 700 is mounted to the end wall 251(2) of the second motor case 250(2) so as to act on the inner end 222 of the motor shaft 220.

The port block 300D is formed with the pair of operational fluid passages 310a, 310b (not shown in FIG. 21) likewise to each of the above embodiments.

As described above, the hydraulic pump main body 410 forms the HST in cooperation with the hydraulic motor main body 210 and the second hydraulic motor main body 210(2) in the present embodiment.

Accordingly, in the present embodiment, the pair of operational fluid passages 310a, 310b fluidly connect the hydraulic motor main body 210 and the second hydraulic motor main body 210(2) with respect to the hydraulic pump main body 410 in parallel.

Specifically, one (for example, the first operational fluid passage 310a that becomes high-pressure at a forward movement of the vehicle) of the pair of operational fluid passages 310a, 310b has a first end opened to the pump surface 300P through the pump-side porting that becomes high-pressure at the forward movement of the vehicle and fluidly connected to the hydraulic pump main body 410, and a second end branched into two fluid passages.

One of the two fluid passages is opened to the motor surface 300M through the motor-side porting that becomes high-pressure at the forward movement of the vehicle and fluidly connected to the hydraulic motor main body 210, and the other of two fluid passages is opened to the second motor surface 300M(2) through the motor-side porting that becomes high-pressure at the forward movement of the vehicle and fluidly connected to the second hydraulic motor main body 210(2).

Similarly, the other (for example, the second operational fluid passage 310b that becomes low-pressure at the forward movement of the vehicle) of the pair of operational fluid passages 310a, 310b has a first end opened to the pump surface 300P through the pump-side porting that becomes low-pressure at the forward movement of the vehicle and fluidly connected to the hydraulic pump main body 410, and a second end branched into two fluid passages.

One of the two fluid passages is opened to the motor surface 300M through the motor-side porting that becomes low-pressure at the forward movement of the vehicle and fluidly connected to the hydraulic motor main body 210, and the other of two fluid passages is opened to the second motor surface 300M(2) through the motor-side porting that becomes low-pressure at the forward movement of the vehicle and fluidly connected to the second hydraulic motor main body 210(2).

The thus configured wheel motor device 100D achieves, in addition to the effects of each of the above embodiments, an effect of increasing volume of a motor side of the HST, thereby increasing output torque of the HST.

In the present embodiment, the port block 300D includes, as shown in FIG. 21, the vertical portion 301 extending substantially vertically, and the horizontal portion 302 extending substantially horizontally from the upper end of the vertical portion 301 so as to extend inward in the width direction of the vehicle from the vertical portion 301 above the motor shaft 220.

The hydraulic pump unit 400 is supported on the upper surface of the horizontal portion 302, and the hydraulic motor unit 200 is supported on the outer surface of the vertical portion 301 facing outward in the width direction of the vehicle. The second hydraulic motor unit 200(2) is supported on the inner surface of the vertical portion 301 facing inward in the width direction of the vehicle so as to position in a dead space below the horizontal portion 302 and inward in the width direction of the vehicle than the vertical portion 301.

The arrangement makes it possible to provide the wheel motor device 100D with the second hydraulic motor unit 200(2) while preventing enlargement of the wheel motor device 100D.

The second hydraulic motor unit 200(2) is preferably of a variable displacement type in which the suction/discharge amount of the second hydraulic motor main body 210(2) could be changed.

That is, the second hydraulic motor unit 200(2) may further include, in addition to the configurations, a second motor-side output adjusting member 230(2) for changing the suction/discharge amount of the second hydraulic motor main body 210(2).

The second motor-side output adjusting member 230(2) may include a movable swash plate 231(2) directly or indirectly contacting with free ends of the second motor-side pistons 212(2) to define a reciprocating range of the second motor-side pistons 212(2), and a control shaft (not shown) capable of being externally operated to slant the movable swash plate 231(2), as shown in FIG. 21.

The second motor-side output adjusting member 230(2) is capable of adjusting the volume of the second hydraulic motor main body 210(2) between a neutral state at which the suction/discharge amount of the second hydraulic motor main body 210(2) is set substantially at zero and a maximum volume state at which the movable swash plate 231(2) is slant to a maximum slanting angle in such a direction that the total volume of the hydraulic motor main body 210 and the second hydraulic motor main body 210(2) increases.

It is possible to adjust an output state of the HST in accordance with a traveling load applied on the vehicle at traveling by utilizing the variable displacement type hydraulic motor main body as the second hydraulic motor main body 210(2).

However the explanation in the present embodiment is made by taking, as an example, the case where the second hydraulic motor unit 200(2) is provided in the wheel motor device 100B according to the second embodiment, it is of course possible to provide the wheel motor device 100A, 100C according to the first or third embodiment with the second hydraulic motor unit 200(2).

For example, in a case where the second hydraulic motor unit 200(2) is provided in the wheel motor device 100C according to the third embodiment, the inner surface of the vertical portion 1301 facing inward in the width direction of the vehicle functions as the second motor surface 300M(2).

Fifth Embodiment

Still another embodiment of the wheel motor device according to the present invention will now be described with reference to the accompanying drawings.

Figure 22:
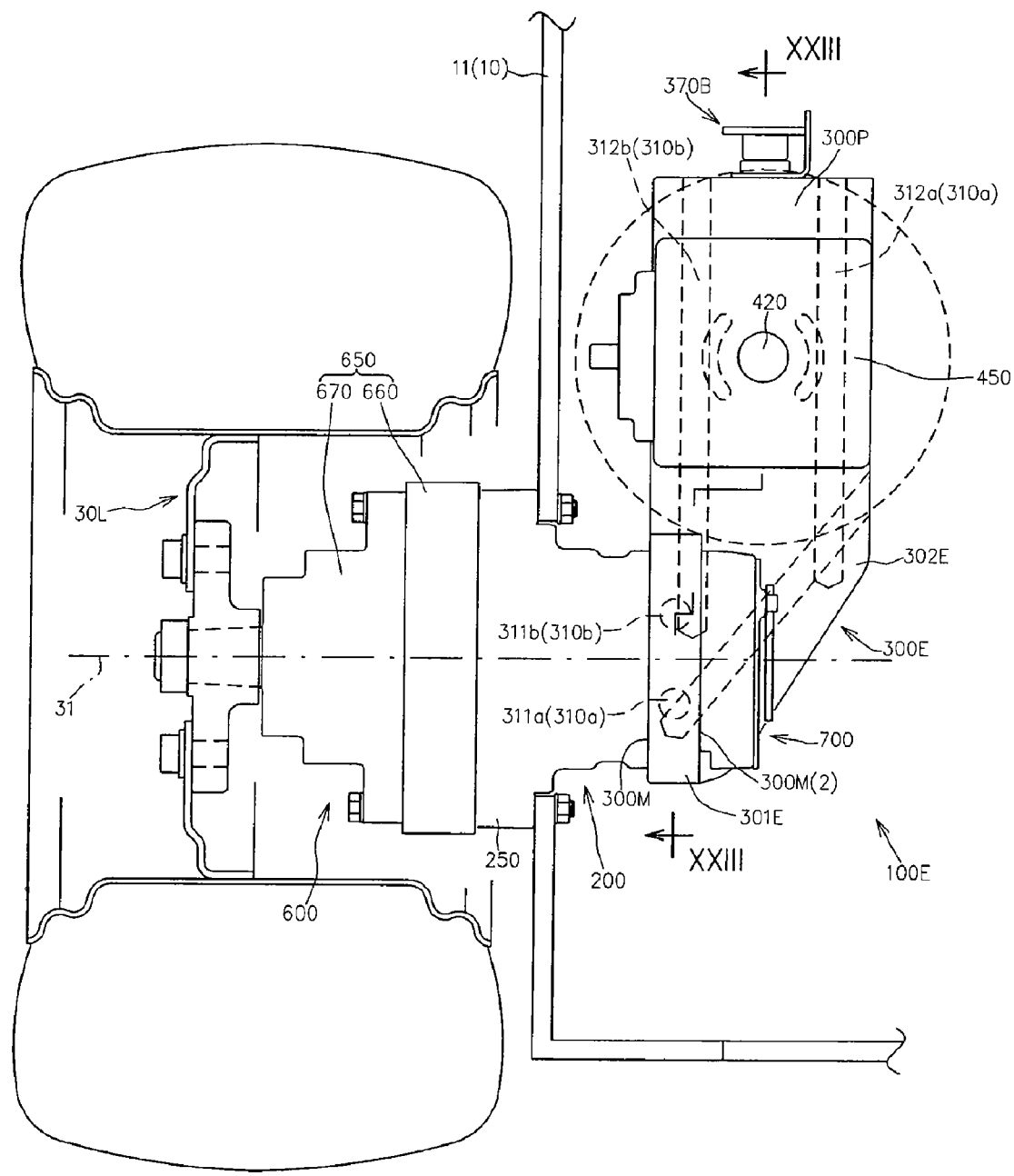
FIG. 22 is a plan view in the vicinity of a left-side driving wheel in a working vehicle to which a wheel motor device according to a fifth embodiment of the present invention is applied.

FIG. 22 shows a plan view in the vicinity of the left-side driving wheel 30L in a working vehicle to which a wheel motor device 100E according to the present embodiment is applied.

Figure 23:
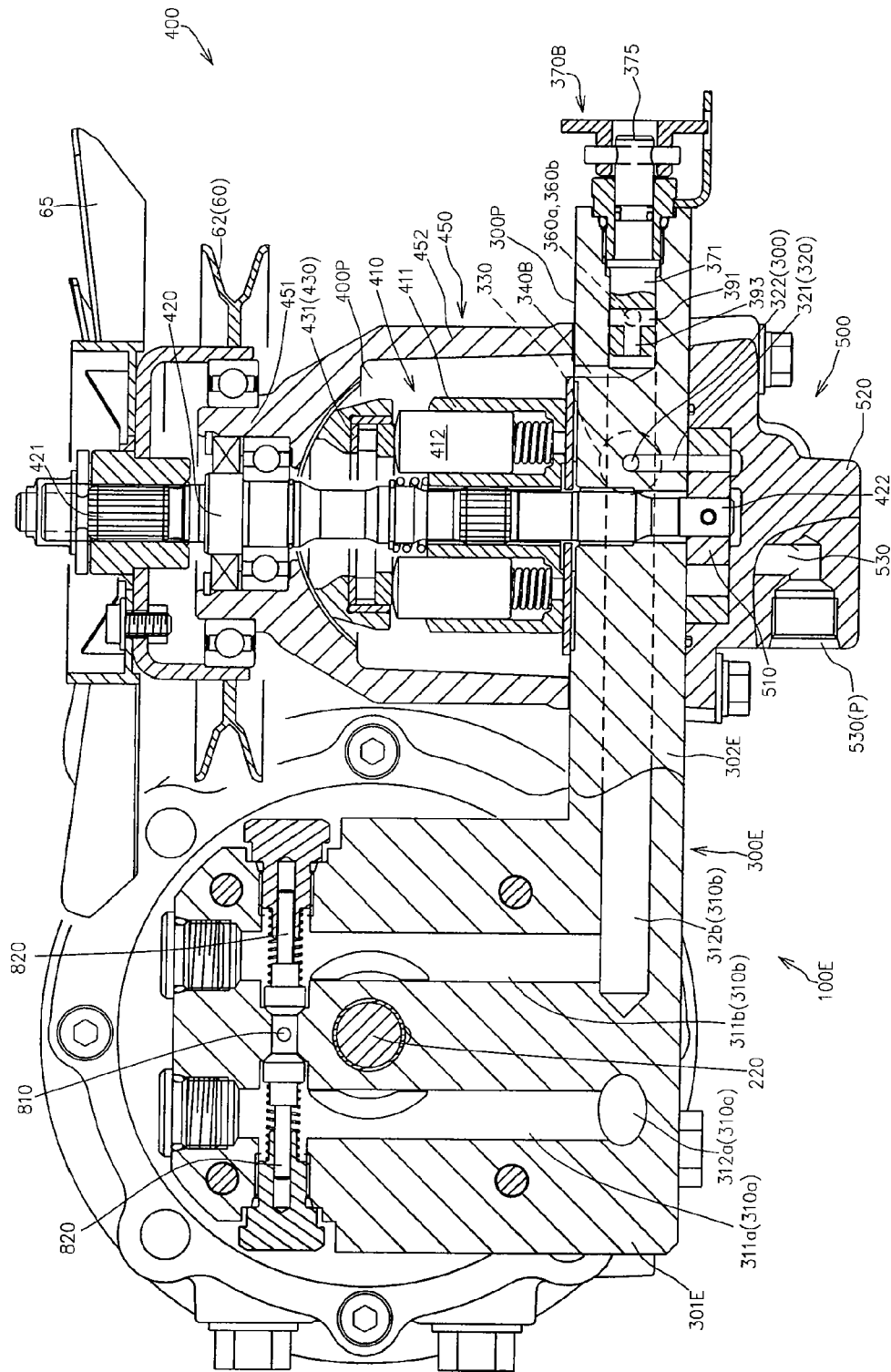
FIG. 23 is a vertical cross sectional view of the wheel motor device taken along a line XXIII-XXIII in FIG. 22.

FIG. 23 shows a vertical cross sectional view of the wheel motor device 100E taken along a line XXIII-XXIII in FIG. 22.

In the drawings, the same elements as those of the first to fourth embodiments have been given the same reference characters to omit a detailed description thereof.

In each of the above embodiments, the hydraulic pump unit 400 is supported on the pump surface 300P that is positioned above the motor shaft 220 of the hydraulic motor unit 200 such that the hydraulic pump unit 400 is positioned above the hydraulic motor unit 200.

On the other hand, the wheel motor device 100E according to the present embodiment is configured such that at least a part of the hydraulic pump unit 400 is positioned at the same position as the hydraulic motor unit 200 with respect to the vertical direction.

Specifically, the wheel motor device 100E according to the present embodiment includes a port block 300E in place of the port block 300B, in the wheel motor device according to the second embodiment.

The port block 300E includes, as shown in FIGS. 22 and 23, a vertical portion 301E extending substantially vertically so as to be orthogonal to the rotational axis line 31 of the corresponding driving wheel 30L, and a horizontal portion 302E extending substantially horizontally from the vertical portion 301E so as to be below the motor shaft 220.

In the configuration, an outer surface of the vertical portion 301E facing outward in the width direction of the vehicle forms the motor surface 300M, and an upper surface of the horizontal portion 302E forms the pump surface 300P.

It is possible to miniaturize the wheel motor device 100E as much as possible with respect to the vertical direction by mounting the hydraulic pump unit 400 on the upper surface of the horizontal portion 302E that extends substantially horizontally from the vertical position at a position below the motor shaft 220.

Accordingly, it is possible to locate the driver's seat 2 and the engine 20, which are positioned above the wheel motor device 100E, as low as possible, thereby contributing to ease of getting-on/off the driver's seat 2 and fosterage of the stability of the vehicle at traveling thanks to a lowered center of gravity of the vehicle.

In the present embodiment, the horizontal portion 302E extends in one side (the forward side in the present embodiment) along the longitudinal direction of the vehicle from the lower end of the vertical portion 301E, as shown in FIGS. 22 and 23.

That is, in the present embodiment, the port block 300E supports the hydraulic pump unit 400 at a position displaced from the hydraulic motor unit 200 in the one side along the longitudinal direction of the vehicle such that the hydraulic pump unit 400 is not overlapped with the hydraulic motor unit 200 as viewed along the width direction of the vehicle.

The arrangement makes it possible to ensure the free space between the pair of right-side and left-side wheel motor devices 100E as much as possible.

The port block 300E is formed with various fluid passages including the pair of first and second operational fluid passages 310a, 310b, likewise to each of the above embodiments.

In the present embodiment, the bypass valve 370B is mounted to an end surface (an front surface in the present embodiment) of the horizontal portion 302E positioned on one side in the longitudinal direction of the vehicle such that the operating portion 375 faces to the one side (the forward side) in the longitudinal direction of the vehicle as shown in FIGS. 22 and 23, thereby enhancing accessibility to the bypass valve 370B.

However the auxiliary pump main body 510 is used as the hydraulic pressure source for the external hydraulic device 15 and the operational fluid source for the HST in each of the above embodiments, the auxiliary pump main body 510 is used only as the operational fluid source for the HST in the present embodiment.

Specifically, the common charge fluid passage 321 of the charge fluid passage 320 formed in the port block 300E has a first end opened to a surface contacting with the auxiliary pump case 520 so as to fluidly connect to the discharge side of the auxiliary pump main body 510, as shown in FIG. 23.

The wheel motor device 100E according to the present embodiment may be provided with the second hydraulic motor unit 200(2).

Specifically, the inner surface of the vertical portion 301E facing inward in the width direction of the vehicle may be used as the second motor surface 300M(2) to which the second hydraulic motor unit 200(2) is mounted.

This specification is by no means intended to restrict the present invention to the preferred embodiments set forth therein. Various modifications to the wheel motor unit may be made by those skilled in the art without departing from the spirit and scope of the present invention as defined in the appended claims.

The invention claimed is:

1. A wheel motor device for a vehicle comprising:
a pump shaft operatively driven by a driving power source,
a hydraulic pump main body supported by the pump shaft in a relatively non-rotatable manner with respect thereto,
a pump case,
a hydraulic motor main body forming an HST in cooperation with the hydraulic pump main body,
a motor shaft supporting the hydraulic motor main body in a relatively non-rotatable manner with respect thereto and operatively driving a corresponding driving wheel,
a motor case,
a port block to which the pump case is detachably connected so as to form a pump space for accommodating the hydraulic pump main body and to which the motor case is detachably connected so as to form a motor space for accommodating the hydraulic motor main body, wherein the port block includes a vertical portion which extends substantially vertically so as to be orthogonal to a rotational axis line of the corresponding driving wheel and whose outer surface facing outward in a width direction of the vehicle forms a motor surface to which the motor case is connected, a horizontal portion which extends inward in the width direction of the vehicle from an upper end of the vertical portion so as to form an inverted L-like shape in cooperation with the vertical portion and whose upper surface forms a pump surface to which the pump case is detachably connected, and a pair of operational fluid passages fluidly connecting between the hydraulic motor main body accommodated in the motor space in a state of being contacted with the motor surface in a sliding manner around its axis line and the hydraulic pump main body accommodated in the pump space in a state of being contacted with the pump surface in a sliding manner around its axis line, a communicating fluid passage formed in the port block so as to fluidly connect between the pump space and the motor space, a discharge fluid passage having a first end fluidly connected to one of the pump space and the motor space and a second end opened outward, a bypass fluid passage formed in the port block so as to fluidly connect the pair of operational fluid passages, a bypass valve mounted to the port block so as to selectively have the bypass fluid passage in a fluidly-connecting state or a shutting-off state based on an external operation, wherein the pump shaft has a first end extending upward from the pump case so as to form an input end and a second end extending downward from the horizontal portion, wherein the motor shaft has a first end extending outward in the width direction of the vehicle from the motor case so as to form an output end and a second end extending inward in the width direction of the vehicle from the vertical portion, wherein there is provided an auxiliary pump unit that is supported by a lower surface of the horizontal portion in a state of being driven by the second end of the pump shaft, wherein there is provided a brake unit that is connected to an inner surface of the vertical portion facing inward in the width direction of the vehicle so as to selectively apply a brake force on the second end of the motor shaft, wherein the bypass valve is mounted into an installation hole with an operating portion thereof being projected outward in the width direction of the vehicle from the installation hole, the installation hole being formed in the port block so as to have a first end opened at an area of the outer surface of the vertical portion that is positioned above the motor case and extends along the width direction of the vehicle, wherein the communicating fluid passage includes a motor-side communicating fluid passage having a first end fluidly connected to the motor space and a second end fluidly connected to the installation hole, and a pump-side communicating fluid passage having a first end fluidly connected to the pump space and a second end fluidly connected to the installation hole, wherein the bypass fluid passage includes a first bypass fluid passage having a first end fluidly connected to one of the pair of operational fluid passages and a second end fluidly connected to the installation hole, and a second bypass fluid passage having a first end fluidly connected to the other one of the pair of operational fluid passages and a second end fluidly connected to the installation hole, and wherein the bypass valve fluidly connects the communicating fluid passage to the bypass fluid passage when having the bypass fluid passage in the fluidly-connecting state and fluidly disconnects the communicating fluid passage from the bypass fluid passage when having the bypass fluid passage in the shutting-off state.

2. A wheel motor device according to claim 1, wherein the motor case is arranged with a mounting portion for mounting the wheel motor device to a vehicle frame in a state where the pump case is free with respect to the vehicle frame.

\* \* \* \* \*